[US008540094B2](#)

United States Patent
Riedl

(10) Patent No.: US 8,540,094 B2
(45) Date of Patent: Sep. 24, 2013

(54) COLLAPSIBLE BOTTLE, METHOD OF MANUFACTURING A BLANK FOR SUCH BOTTLE AND BEVERAGE-FILLED BOTTLE DISPENSING SYSTEM

(76) Inventor: John Thomas Riedl, Northbridge (AU)

( * ) Notice: Subject to any disclaimer, the term of this patent is extended or adjusted under 35 U.S.C. 154(b) by 0 days.

(21) Appl. No.: 13/379,655

(22) PCT Filed: Jun. 21, 2010

(86) PCT No.: PCT/AU2010/000774
§ 371 (c)(1),
(2), (4) Date: Dec. 21, 2011

(87) PCT Pub. No.: WO2010/148433
PCT Pub. Date: Dec. 29, 2010

(65) Prior Publication Data
US 2012/0097634 A1   Apr. 26, 2012

(30) Foreign Application Priority Data
Jun. 21, 2009  (AU) ................................ 2009902936

(51) Int. Cl.
*B65D 90/02* (2006.01)
*A47J 41/00* (2006.01)

(52) U.S. Cl.
USPC ........ 215/13.1; 215/379; 428/36.91; 493/264

(58) Field of Classification Search
USPC ..................... 215/13.1, 382, 379; 220/62.22, 220/62.21, 62.17, 62.12, 678, 677; 493/264, 493/243, 217
IPC ................. A47J 41/00; B65D 23/02, 1/40, 3/22, B65D 90/02
See application file for complete search history.

(56) References Cited

U.S. PATENT DOCUMENTS

| | | | |
|---|---|---|---|
| 1,342,769 A * | 6/1920 | Selz | 229/193 |
| 2,751,953 A | 6/1956 | Grimm | |
| 3,460,740 A * | 8/1969 | Hagen | 206/523 |
| 4,017,008 A * | 4/1977 | Raitport | 222/94 |
| 4,447,974 A | 5/1984 | Vicino et al. | |
| 2009/0104324 A1 | 4/2009 | Bradley | |

FOREIGN PATENT DOCUMENTS

| | | |
|---|---|---|
| CA | 2034944 A1 | 7/1992 |
| DE | 3813218 A1 | 11/1989 |

* cited by examiner

*Primary Examiner* — Jacob K Ackun
*Assistant Examiner* — Robert J Hicks
(74) *Attorney, Agent, or Firm* — Shewchuk IP Services, LLC; Jeffrey D. Shewchuk

(57) ABSTRACT

A double-skinned inflatable bottle blank is manufactured by: (i) stacking two sheets of liquid impermeable, flexible foil material; (ii) blanking the sheets; (iii) bonding the two blanks along joining seams that follow contoured perimeter edges to define a double skinned blank which can be inflated through an inflation location; (iv) additionally bonding the two blanks at in a predetermined grid of seams to provide an upstanding peripheral wall with intersecting, inflatable stiffener structures; (v) folding the double skinned blank; and (vi) selectively bonding together portions of the joined perimeter edge of the double skinned blank to define a double-skinned, inflatable bottle blank with an internal cavity surrounded by a bottom wall, peripheral wall and top wall with a dispensing orifice, the inflatable stiffener structures between the seams providing an exoskeleton about the internal cavity when inflated.

22 Claims, 10 Drawing Sheets

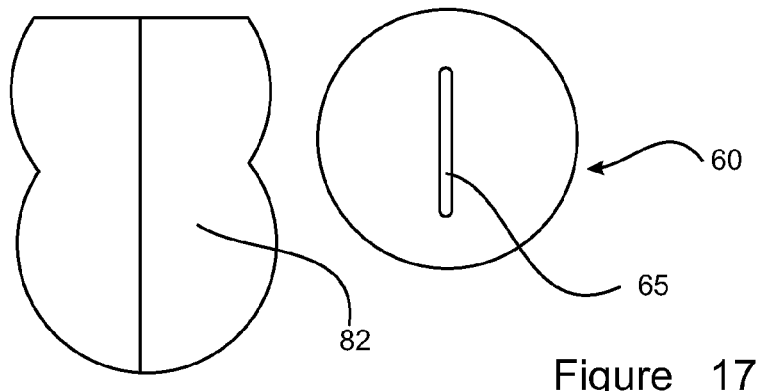
Figure 17
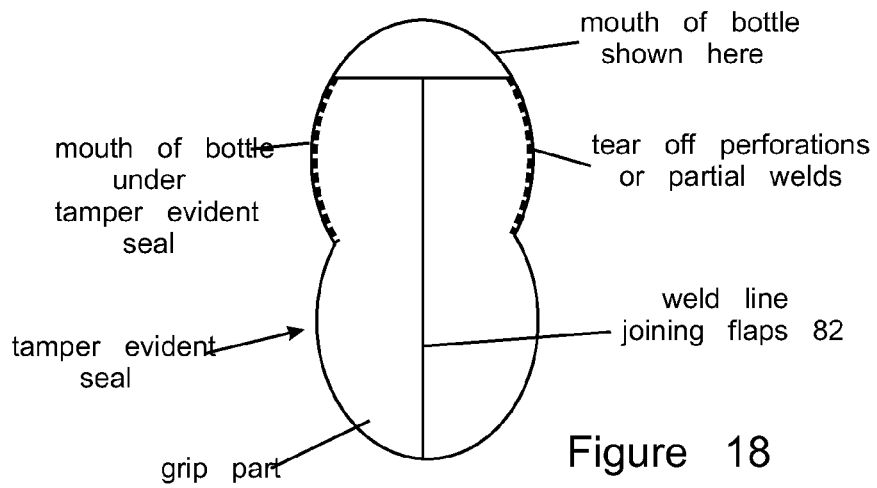
Figure 18
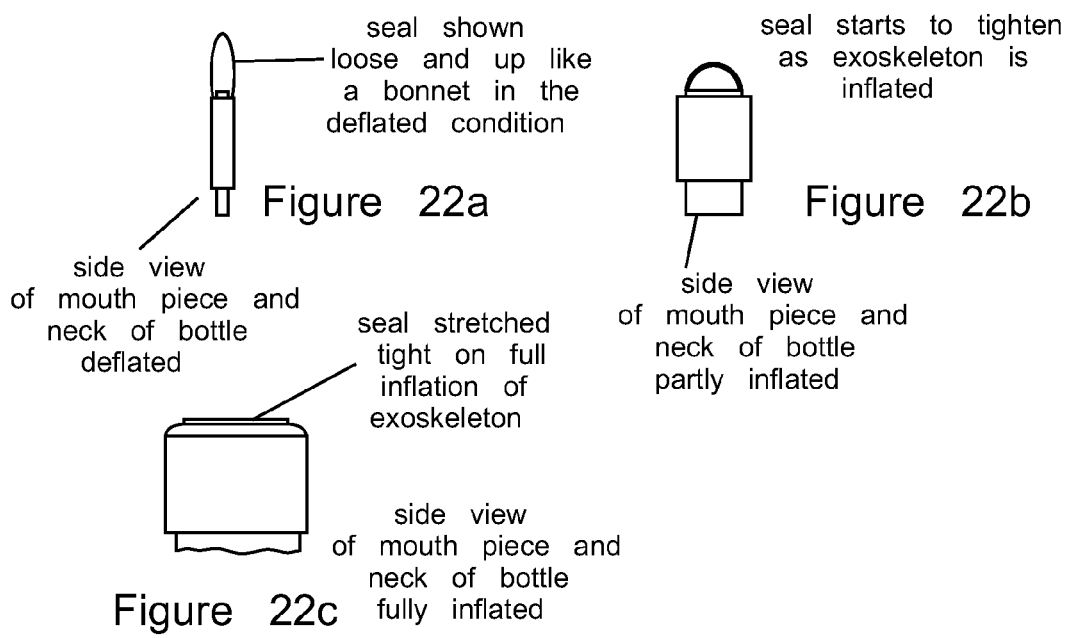
Figure 22a
Figure 22b
Figure 22c ns in providing bottled beverages to consumers at a point of
COLLAPSIBLE BOTTLE, METHOD OF MANUFACTURING A BLANK FOR SUCH BOTTLE AND BEVERAGE-FILLED BOTTLE DISPENSING SYSTEM This is a national phase under 35 U.S.C. §371 et seq. of Application No. PCT/AU2010/000774 filed Jun. 21, 2010. This application is also a continuation of Application No. PCT/AU2010/001071 filed Aug. 20, 2010. The text and full drawings of Application No. PCT/AU2010/001071 are incorporated by reference.

FIELD OF THE INVENTION

The present invention is concerned with inflatable, portable containers, in particular bottle-shaped, for holding liquids, having a double-skinned wall of flexible and collapsible nature defining an inner cavity for holding a liquid and at least one inflation chamber between the inner and outer skins disposed to receive a fluid and be pressurised thereby to erect and impart rigidity to the bottle, an inflation valve with the wall providing sealable access to the inflation chamber and a dispensing orifice in communication with the inner cavity providing access to fill the bottle and dispense liquid from it. The invention is also concerned with methods of manufacturing such portable containers using weldable foil materials, wherein a bladder-like blank is formed of suitably impermeable single or multi-layer foil material thereby to define the inner cavity (to be filled with liquid) and the inflation chambers (to be filled with pressurised gas or liquid). The present invention is also concerned with a point-of-sale, bottled beverage dispensing system that uses such inflatable bottles.

BACKGROUND TO THE INVENTION

The present invention was conceived against a background that takes account of diverse and often conflicting factors present in the bottled beverage industry, the bottle manufacturing industry and consumers of beverages. Therefore, it is appropriate to provide a broader overview to enable the skilled reader to appreciate the merit of the proposed solutions in providing bottled beverages to consumers at a point of sale or dispensing location.

Billions of rigid and semi-rigid bottles made of glass and plastic materials, such as PET (Polyethylene Terephtalate) and PE, are manufactured annually using well know techniques and materials, such as by blow moulding, spin-casting etc. The bottles are produced by specialist manufacturers and transported empty to bottling companies, where the bottles are filled with a variety of liquids for consumption by end-users. From the bottling factories, product is then distributed to points of sale, such as supermarkets, restaurants and vending machines, often over thousands of kilometers. Blow moulded PET bottles have in particular found favour over the years and to a large extent have replaced glass bottles, as these are lighter in weight, and thus less costly to freight. However, transport costs of empty bottles are still high, as freight is also charged based on volume.

A further drawback that exists with existing beverage bottles is that whereas many of the conventional rigid and semi-rigid bottles used are recyclable, a great many are dumped and occupy large physical volumes in the collection, removal, transport, disposal and landfill processes. The bottled beverage market using rigid or semi-rigid bottles is therefore environmentally highly negative, despite the 'recyclable' nature of the bottles.

Brick, gable-top and otherwise shaped 'cartons' are also widely used for storing and dispensing liquids, compare the ubiquitous milk cartons found in a local supermarket. The cartons comprise a multi-layer composite plastic and cardboard blank which is folded and welded (or otherwise glued) into a shape defining a liquid holding cavity which is filled prior to the carton being sealed-off into its final shape. Brick shaped cartons are also used as juice containers with various filling volumes (typically 100 to 2000 ml), and as of relatively recently may also incorporate a separate, rigid plastic pouring/dispensing neck with threaded closure cap fixed to one of the gable walls. Because of the nature of manufacture and filling of these type of liquid containers, large centralised filling ('bottling') stations are required, from where the filled cartons are then shipped to points of sale, again often over large distances and in bulky fashion.

It is also known to 'bottle' beverage liquids, in particular juices, in pouches made of flexible foil materials, which have a certain degree of rigidity but remain malleable once filled, and therefore can be displayed on shelves for purchase in an upright, self-supporting manner. Such pouches loose shape stability as they dispense their contents during use, and are thus typically sized to provide single serve liquid amounts, typically between 100 and 330 ml. Once emptied, these pouches are easily flattened (as can be the above described cartons) and require therefore less landfill size for disposal. Most beverage pouches are made of composite materials that are susceptible to recycling, and thus go some way in addressing some of the concerns noted above. However, beverage pouch filling operations are currently effected at larger filling facilities and the concomitant high transport and storage costs for the filled pouches to reach the point of consumption noted above in the context of rigid bottles still apply.

Furthermore, beverage-filled pouches have not found wide-spread consumer acceptance, possibly because of tactile misapprehensions in that the malleable nature of such pouches fosters ease of deformation during dispensing, which thus requires such pouches to be provided with a straw for dispensing its liquid contents into the mouth of a person. Newer pouch designs incorporate a rigid plastic pouring/filling neck component that is welded to a side wall of the pouch during its manufacture; the neck itself has an external or internal thread for sealingly supporting a screw-cap member (with security/tamper indication functionality) that enables the pouch to be re-closed; pouring of the liquid, as done with conventionally shaped bottles, is thereby enabled. Nonetheless, the malleable nature of the pouch remains a drawback for many users.

Collapsible, bladder-type containers are also widely used in the purified water and wine industry; in the wine industry in Australia these are known as wine casks. A variety of plastic material-based foils have been used for this purpose since the 1960s and are well proven to provide safe storage of wine, water and other liquids. Typically, the films used in the manufacture of the bladders consist of laminates of at least two materials, often involving a metallisation layer to improve barrier properties. The flexible bladders can be stored with, minimum space requirements prior to filling, and collapse essentially into a flat body when empty, like a flattened pillow-case. For point of sale dispensing, the bladders themselves are typically contained within, and supported by, a rigid card-board container to simplify handing. Because the bladder is flexible and mobile and hence very awkward to hold, without the external cardboard container, such bladders are impractical to use.

Finally, collapsible containers for holding liquids and which have inflatable walls to provide a semi-rigid body, when inflated, are also known. For example, U.S. Pat. No. 2,751,953 discloses a cylindrical close-ended container having a double-skinned peripheral wall, bottom and top. A series of valve armatures embedded in the circular end walls serve to enable and control air flow from within the inner cavity of the container (defined or enveloped by the inner skin of the walls) into the pressurising cavity formed between the inner and outer skins of the peripheral and end walls. A filling armature bridges both skins between the inner cavity and the outside of the container to allow filling of the erected (ie inflated) container and dispensing of liquid there from. The principle of imparting rigidity to such inflatable containers is well known in that when flexible, air (liquid) impermeable material foils are sealed to form an inner chamber and the latter is subsequently filled with a liquid (eg air) and pressurised, the flexible foil body becomes 'rigid' and attains a shape dictated by the inflation chamber(s) geometry. In a 'deflated' state, the peripheral wall collapses into an accordion-like pleated configuration either by itself or when the upper end wall is pushed towards the lower end wall, depending on the thickness of the skins that make up the wall.

Canadian patent document CA 2,034,944, which is also related to inflatable vessels for holding liquids, although wide mouthed, ie a mug, correctly identifies a shape stability problem that exists with cylindrical-bodied, double-walled inflatable vessels having a large height compared to the diameter of its circular bottom. The question comes down to welding (or otherwise sealingly joining) the two sheets or foils that make up the peripheral upright walls of the container in such manner that once inflated, the container is form-stable (or rigid) enough in its inflated state to allow handling during filling, transport and when used by a consumer as a beverage bottle to dispense its contents in secure and controlled manner. A particular problem arises in the context of providing an inflatable liquid container of the type having planar side walls, eg a quadrilateral or multi-faceted bottle, where individual side wall panes adjoin along a vertical welding seam that extends over a substantial portion of the height of the bottle. When inflated, even small pressure exerted simultaneously at oppositely located vertical edges of the bottle would lead to distortion of the bottle, akin to the deformation which a square would undergo into a rhombus when oppositely directed forces are applied to the corners of the square.

From a cost point of view, it is well known that branded bottled water shipped internationally in individual bottles results in a product often more expensive per liter than petrol. For example, water from the European Alps, would typically be purified at the point of extraction/origin, and bottled in a large scale, local, bottling plant. It would then be put into cartons and pallets and put into a local warehouse. It would subsequently be handled many times through rail, truck and ship transport systems as well as several warehouses, to deliver it to the end destination warehouse. From here, it would be transported by truck to either a refrigerated vending machine or a retail outlet, which often uses refrigerated display cabinets.

The many handling, storage and transport steps associated with such approach are costly and have a large carbon footprint. In the case of domestic bottled water, as opposed to imported bottled water, the number of handling and transport steps are reduced, but are still very significant in both cost and carbon footprint.

In contrast, tap or municipal water is widely available and indeed water fountains where people may drink mains water, which is treated to potable standards, are not uncommon in many countries. Sanitary concerns remain due to the public accessible nature of such water dispensing facilities. Tap water is of course also available at most food outlet locations, and other commercial retail locations. Even in countries where tap water is not necessarily treated at a central facility to meet WHO standards, it is easily able to be processed locally to a quality comparable to or exceeding that of bottled water using methods well known to those skilled in the art of potable water. A wide variety of filter technologies is readily available to achieve this with the highest standard being achieved by reverse osmosis (RO) filtering. For the volume of drinking water typically required by a retail outlet, the required filtering equipment is small, and could be readily mounted within the confines of typically sized bottled water dispensing (vending) machines or refrigerators (2000×1000×900 mm).

It is also known that purified water with no additives or with selected additives to simulate mineral waters, for example, and carbonated and flavoured beverages, can be produced (ie mixed) at the physical location of its point of sale, eg as is customarily done at fast food outlets, bars, etc. Such approach provides considerable savings over the cost of a centralised bottling of conventional bottled beverages (be it water or soft drinks) in large scale facilities and its subsequent transport, warehousing and refrigeration as described above. Known flavouring and carbonating equipment can be incorporated within the volumetric confines of typical dispensing (and vending) machines, and dispensed into cups and similar open mouthed containers.

Perhaps equally common are hot beverage dispensing machines for coffee, tea, chocolate and similar drinks, where a beverage is prepared on demand by percolating heated water through a cartridge or other permeable container containing, eg, granules of instant coffee and dispensing the resultant favoured beverage into a cup. Self-contained automatic coffee vending machines are well known in the art of beverage vending machines, in particular in the USA. Such machines incorporate, within a common housing, discrete units and stations that co-operate in preparing and dispensing a beverage made on demand. To this end, a supply of nested paper or polystyrene cups is stored in a dedicated zone of the vending machine and dispensed into a filling station where the hot beverage (could also be cold, of course) prepared in a separate zone, is filled into the cup. A customer can then remove the filled cup, whereby some machines are known which also store lids which are dispensed and fitted onto the rim of the cup, after the cup is filled, to help against spilling of the hot beverage whilst handled by a customer.

Against all this background information, it would be desirable to devise a container/bottle for holding liquids which meets one or more (preferably all) of the following requirements: (i) can be stored using minimum space in a collapsed state prior to being filled with a liquid; (ii) can be erected prior to or during filling with liquid contents into a vessel resembling conventional beverage containers, at a point of sale or dispensing of the bottle; (iii) once filled with liquid, exhibit sufficient rigidity and shape-stability to allow handling by a user in a manner similar to PET or similar bottles and withstand forces typically encountered during normal handling, in particular remain shape-stable when drinking there from; (iv) be re-sealable after opening; (v) after emptying can be collapsed into its original state for disposal or recycling.

It would be further desirable to devise an inflatable, double-walled bottle blank which can be erected, ie shaped by inflation, into a bottle-shaped container with an internal cavity for receiving a beverage, at a bottled beverage point of sale location, which once erected is able to maintain a degree of rigidity in its deployed or erected shape, and which incorporates a bottle closure mechanism that can be re-closed on demand.

It would also be beneficial to devise a manufacturing method for such inflatable, double-skinned bottle which minimises component count, eg manufacture an inflatable bottle using a minimum of discrete components, preferably only two sheets or foils of weldable plastic film.

It would also be advantageous to provide an inflatable bottle design and manufacturing method which provides for an integral bottle closure mechanism, ie a design that dispenses with the need for a separate (although integrated) screw-cap or similar type of removable closure element at a dispensing spout or neck of the bottle. If a tamper indicator element can be incorporated to indicate an un-opened state of the bottle, the better.

Equally, it would be advantageous to provide a design in which the elements required to provide an inflation valve and deflation mechanism for the inflation chamber(s) of the bottle, required to erect and deflate it, are made integral with the bottle, eg make use of the same materials used in manufacturing the bottle/container.

Finally, it would also be desirable to utilise an existing mains water dispensing location (eg a fixed tap) and make use of such inflatable, point of dispensing erectable bottles in providing a new type of bottled beverage dispensing system.

In the context of this patent specification, it will be appreciated that the term 'bottle' is used as a generic term to encompass containers having a vast variety of shapes commonly used for storing all types of liquids for human (or animal) consumption, such as encountered in or typical of glass or plastic beverage bottles and prismatic containers such as milk cartons, etc. Consequential to being concerned with containers for holding liquids, terms such as 'bottom', 'top', 'side', 'height' and similar are used to provide relative reference locations of parts/portions of such container and are not to be understood in the absolute sense; as is known, there are bottle designs intended to be stored 'up side down' with the dispensing orifice pointing 'downward', ie the bottom of the bottle would in such case be located above or on top of the dispensing orifice.

Equally, the terms 'liquid' and 'beverage' can be used interchangeably, in so far as these encompass water, flavoured drinks, carbonated drinks, juices, milk etc and other consumable liquids such as soups, graveys etc, which are typically filled into bottles for storage and subsequent pouring there from. The term 'fluid' on the other hand is used to denote liquids and gases such as can be used to 'inflate' and pressurise an inflatable, deformable, but preferably inelastic, bladder into an erected double skinned or walled vessel or container, eg air, water under pressure, etc.

SUMMARY AND FURTHER ASPECTS OF THE INVENTION

From a production point of view, a first aspect of the invention resides in a process of manufacturing a double-skinned inflatable bottle blank which comprises: (i) stacking two sheets of liquid impermeable, flexible foil material, preferably in coplanar arrangement; (ii) blanking the sheets to create respective, preferably shape-congruent blanks having each a contoured perimeter edge; (iii) bonding the two blanks along joining seams that follow the contoured perimeter edges but for at one or more inflation locations, thereby to define a double skinned blank into which an inflating fluid can introduced through the inflation location; (iv) additionally bonding the two blanks at a plurality of discrete stiffening seams which are arranged in a predetermined grid or pattern thereby defining a grid-work of intersecting, inflatable stiffener structures in at least such part of the double skinned blank which will provide an upstanding peripheral wall of the bottle when erected through inflation; (v) folding the double skinned blank and (vi) selectively bonding together portions of the joined perimeter edge of the double skinned blank, but for at a predetermined filling/dispensing location, to define a double-skinned, inflatable bottle blank with an internal cavity surrounded by a bottom wall for standing the bottle upright, said peripheral wall and a top wall, the filling/dispensing location located preferentially in the top wall such as to define a dispensing orifice for filing and dispensing liquid into and from the internal cavity, and the inflatable stiffener structures providing an exoskeleton about the internal cavity when inflated.

In accordance with a container-structural, or second, aspect of the present invention there is provided an inflatable bottle comprising inner and outer sheets of fluid impermeable flexible foil material which are stacked and bonded along a contoured perimeter of the sheets, the bonded sheets being folded such that portions of the bonded perimeters are themselves bonded to each other along joining seams thereby to define, in an erected, inflated state of the bottle, (i) a bottom wall for standing the bottle upright, (ii) a peripheral wall upstanding from the bottom wall and surrounding an internal cavity encased by the inner sheet, (iii) a top wall, (iv) a dispensing orifice, preferably in the top wall, for filing and dispensing liquid into and from the internal cavity, and (iv) at least one inflation cavity between the inner and the outer sheets in at least the peripheral wall which, when fully inflated and pressurised, provides relative stiffness to the erected bottle, wherein the inner and outer sheets are further bonded at a plurality of discrete stiffening seams present in the peripheral wall and arranged in a predetermined grid or pattern thereby defining a grid-work of intersecting, inflatable stiffener structures within the inflation cavity which together provide, in an inflated state, a stiffening exoskeleton about the internal cavity.

The grid of intersecting stiffener structures, once inflated and adequately pressurised, increase the overall stiffness of the wall section in the plane of the wall where these are present, ie provide increased resistance against bending and buckling as compared to a wall embodiment where no additional joining locations are provided beyond the joining seams that frame the wall section. This feature makes the bottle overall more rigid as compared to one with out such grid of additional stiffening bonding seams.

Advantageously, the grid of additional, discrete stiffening seams will be present over the entire peripheral wall. This creates an overall more shape-stable bottle design, in particular assisting in countering squeezing pressure seeking to deform the inflated bottle. Preferably, the grid of additional, discrete stiffening seams will also be present in the top wall, thereby to increase its overall rigidity and shape-stability in particular around the area where the dispensing orifice is provided.

Preferably, the grid of discrete stiffening seams is provided in such manner that an orthogonal array of intersecting stiffener structures is created. Taking the bottom wall or a horizontal plane as reference, the resulting exo-skeleton of stiffener structures will thus consist of horizontally extending inflated ridges and columns, whereby it is preferred to have a plurality of discrete 'micro' columns (in the sense of small dimensioned, not microscopic) respectively extending between and intersecting two horizontal ridges and delimited by horizontally spaced stiffening seams that border the two horizontal ridges. In the alternative, the criss-cross pattern of columns and ridges could be inclined at an angle with respect to the horizontal reference plane.

Preferably, the stacked sheets are blanked (ie cut such that they have a perimeter having a specific exterior edge contour) into a shape that permits folding the double skinned blank into a polyhedral body. To this end, in addition to bonding the sheets along the perimeter line, the sheets are bonded along panelling lines which subdivide the double-skinned blank into a predetermined number of discrete panes, such that folding the blank along said panelling lines and bonding together the free edges of adjoining panes creates the filling cavity and forms the inflatable, self-contained bottle blank which as consequence upon inflation is erected into a polyhedral bottle with substantially planar side faces.

Preferentially, the bottle will have, when viewed in cross-section or top plan view, a quadrilateral peripheral wall configuration, although a pentagonal, hexagonal, octagonal or decagonal peripheral wall configuration may be preferred in some instances where approximation to a circular cross-sectioned bottle is desired. Whilst circular-tubular configurations of the peripheral wall are easily envisioned, problems arise in the process of manufacturing an inflatable blank where a single double-skinned blank is to be cut and subsequently folded into a bottle with a bottom and top wall, where bonding of flaps or portions of the blank is required to make-up the bottom in particular and provide a cylindrical peripheral wall.

Another advantageous constructional feature of a preferred multi-faced (polyhedral), inflatable double-skinned bottle blank design is the presence of discrete stiffening columns extending on either side of those panelling lines which, in an erected and Upright orientation of the bottle, define the upstanding corners of the bottle. The stiffening columns, in an inflated state of the bottle blank, bulge prominently into the cavity of the bottle so as to press against each other and provide in effect a stiffening of the otherwise film-hinge like joint line between the adjoining panes that make up the peripheral wall of the bottle. Such pane joining line stiffener structures can be also provided on other wall sections to counter the film-hinge nature at intersecting wall panes that make up the entire wall.

The top wall of the bottle can be formed gable-top like or be pyramidal in shape with three, four or more truncated triangular panes (panels), wherein the dispensing orifice leading into the bottle cavity is advantageously formed at an apex location where individual top wall panes of the polyhedral bottle meet.

A mouth piece of cylindrical or oval/oblong external configuration and cross-section is advantageously provided as an integral part of the top wall configuration, preferably in extension of the apex of the pyramidal top wall panes.

The mouth piece is advantageously formed as an integral part of the bottle blank itself in that the two stacked blank sheets each have congruent rectangular mouth piece flaps that are bonded along perimeter edges thereof thereby to provide mouth piece inflation chambers in fluid communication with the inflation cavity or chamber of the bottle, and in the process of selectively bonding together portions of the joined perimeter edge of the double skinned blank to define the inflatable bottle blank, the double-skinned mouth piece flaps are themselves joined but for at the filling/dispensing location that defines or provides the dispensing orifice. Such construction provides a lip valve configuration wherein a dispensing channel is formed which extends from the filling orifice to the bottle cavity. This dispensing channel, in an inflated state of the bottle blank, and thus of the mouth piece, is self sealing due to the pressure exerted on one another by the inflated walls surrounding it. In essence, the mouth piece provides a good tactile experience to the drinker, by defining a resilient drinking 'tit', having an on-demand drinking slot in form of a pressure sealed lip valve, which is self sealing when not in use, thereby obviating the need for a screw-on or other cap. The lip valve/dispensing channel is widened/opened to permit passage of liquid into/from the bottle cavity by resilient deformation of the mouthpiece using the mouth, teeth or fingers of a person, by squeezing the lip valve's slit open.

A further advantageous embodiment foresees incorporating a removable, safety seal as an integral part of the mouth piece, preferably also manufactured and formed using appropriately shaped flaps of the blank sheets themselves, preferably in extension of selected ones of the mouth piece flaps, which are selectively folded and bonded to deploy and extend across the dispensing orifice during inflation of the bottle blank.

It will be noted that it is possible to devise a double-skinned bottle blank with separate dispensing and filling orifices, and consequently, with separate filling and mouth pieces, instead of a single, dual purpose filling and dispensing spout or structure as represented by the cylindrical (when inflated) mouth piece. Equally, whilst not a preferred form of this aspect of the invention, it is possible to incorporate discrete filling and dispensing valve and removable closure cap structures, known in the beverage bottle manufacturing industry, of different in construction and lay-out to that provided by the integral lip valve proposed, and secure these in sealing manner to the double-skinned blank prior to and during subsequent folding and bonding into the finalised bottle blank.

As was described in the context of the bottle filling/dispensing orifice, whilst it is possible to provide separate inflation and deflation locations at the outer sheet or between the outer and inner sheets that make-up the double-skinned, inflatable blank, for inflating and deflating the double-skinned wall cavities (including the stiffener structures, that make-up the exoskeleton and the mouth piece) combining an inflation and deflation arrangement at a single location is preferred. This in turn means that all inflatable chambers and cavities of the bottle blank will share a common inflation path, which in turn simplifies the lay-out of an automated inflation facility in a bottle dispensing device or machine, as noted below.

In a preferred form, a self-closing, one way valve arrangement will be provided at the or at each inflation location of the double-skinned blank where the two sheets are not joined/bonded together. Whilst as is the case with the cavity filling/dispensing orifice, such arrangement can be provided by separate valve and closure structures, it is preferred to make these out of the same sheet material as the bottle blank and integral therewith, as this minimises pieces count and avoids the need of incorporating separate structures that themselves are more rigid than the foil material, such as moulded plastic valves and closure caps; it is well recognised that the bonding interface between rigid and semi-rigid plastic valve/closure armatures and flexible, film-like sheets requires special attention, as exemplified by inflatable pool toys, where reinforcement patches are incorporated and bonded around the inflation armature, as these provide known points of failure and ripping more so than the sheet bonding joints.

A one way check valve would advantageously be made integral with and out of the sheet material that makes up the double-skinned, inflatable blank. Preferentially, the check valve is embodied as a flap or diaphragm valve wherein the inner and outer sheets define inflation tabs which stand proud from the contoured perimeter of the sheets and which are themselves welded together at their respective peripheries to define an inflation pre-chamber in fluid communication with the inflation cavity defined within and between the otherwise perimetrically sealed-off inner and outer sheets, an inflation orifice present in one of the tabs being selectively sealed off by a tongue or diaphragm which pressurisation of the inflation cavity of the bottle blank causes to move and be retained against the inflation orifice.

The inflation sealing tongue itself can also be made integral with one or both of the sheets and located within the pre-chamber during folding of the double-skinned blank and subsequent bonding thereof into the inflatable bottle blank. To inflate the bottle blank, a simple needle inflator can be inserted into the inflation orifice and displace the diaphragm, such that once the double-skinned wall of the bottle is inflated and pressurised, upon removal of the inflation pin from the orifice, the diaphragm will return into its closed state pressing against the inflation hole, and for all purposes provide a pressure seal against egress of pressurisation/inflation fluid.

To facilitate deflation for disposal of the bottle once its contents has been dispensed in its entirety, the inflation tabs will incorporate a waist between the pre-chamber and the perimeter of the joined stacked sheets, thereby to provide a weak or tear off point for removal of the inflation tab and thereby cause exposure of the inflation cavity (or chamber) of the bottle to atmosphere.

Several alternative plastic or composite foil materials can be used in manufacturing double-skinned blanks in accordance with the invention, depending on the liquid material to be stored in the bottle and the inflation medium to be employed. Equally, the two sheets may be of different constitution and materials, and can themselves be laminates of different plastic and other material foils. Relevant requirements for the choice of (plastic) film material include: Adequate flexibility across the plane of the film; adequate strength with a certain but limited elasticity in the plane of the film such that can stretch a small amount during inflation, in particular to accommodate stresses at sharp corners and welds but otherwise resist in-plane deformation at inflation pressures of up to 5 atmospheres; food grade; appropriate barrier capabilities for the contents, given that in some instances a simple water barrier may be sufficient whilst in others strong gas (eg oxygen) barrier properties may be required, eg easily oxidisable beverages; appropriate barrier capabilities for the inflation fluid, as the exoskeleton must be able to retain inflation pressure without significant loss for the expected life of the bottle; stability of physical properties within temperature range, typically $-5°$ C. to $+50°$ C.; recyclable; and easily weldable using known welding or adhesive bonding techniques.

Low density or high-density polyethylene (LDPE and HDPE) either alone or combined with a gas barrier film in a laminate are suitable for many applications. So is bi-axially orientated polypropylene BOPP with a barrier film. Metallised films for opacity and improved thermal and visual properties can be incorporated into the wall materials, as can be printable films. Ultimately, the choice of type of film, its strength and thickness, depend upon the size of the bottle, its contents and the desired presentation. Bottles of less than 1 liter, capacity are likely to use two plastic sheets, each between 60 and 100 micron thick, depending on the application, and have a wall thickness of between 3 to 15 millimeters.

It will be understood that blanking of the sheets can be effected either before or after stacking the sheets on top of each other. However, blanking is performed preferentially after bonding the two sheets along joining seams that follow an intended, final contour to be imparted to the flat, joined sheets. Performing the blanking step after bonding otherwise uncut sheets of say quadrilateral shape, obviates the need for ensuring close registry of the sheets so that their contours register with one another at the time of bonding.

Bonding along the perimeter and discrete seams will preferably be affected by welding; although adhesive bonding may also find use. Techniques for welding/adhesive bonding of thin (and otherwise) foils of plastic and plastic-composite foils are well practiced in the art.

It will be noted that it is advantageous to manufacture the double skinned blanks (which will then be folded and further bonded to define the double-skinned bottle blanks) using rolled-up (plastic) film stock material, by drawing respective films from two storage rolls and bringing these together at a reciprocating bonding die and ambos unit or a continuous rotary bonding roller die and counter pressure roller unit. Such machinery is well known in the field of plastic pouch and carton container manufacturing technology. By arranging a blanking die after the bonding unit, to impart the desired outer perimeter contour onto successive portions of the pattern-joined film sheets, whilst removing cut-offs and leaving support strips standing between successive 'punched' bottle blank patterns as well as along the side edges of the locally bonded films, one can in turn provide stock material that can be drawn for subsequent folding and bonding operations to provide the finished, individual bottle blanks that may remain joined at discrete, severable joining locations.

The inflatable bottle design, in particular having one or more of the features and characteristics outlined above in turn permits implementing a new type of bottled beverage dispensing system which it is believed can out-compete traditional vending machines in which a limited number of bottled beverages can be stored, in particular bottled water vending machines.

In a further aspect of the present invention there is provided a beverage dispensing system, including: a water filtering and/or purification device arranged for connection to and receiving water from a mains water supply line; optionally, a flavouring/carbonation unit disposed to receive the purified water and add thereto one or more of a flavouring agent and carbonating agent to create a beverage; a temporary storage facility for receiving and storing the purified water or beverage; a cassette or roll containing a plurality of flattened, inflatable double-skinned bottle blanks having one or more of the preferred and advantageous features/characteristics described above; a transport arrangement adapted to present individualised ones of said inflatable double-skinned bottle blanks to a bottle inflation station; a bottle blank inflation (erecting) unit arranged to supply an inflation fluid and fill same into inflation chambers/cavities present in the bottle blanks thereby to inflate the cavity, pressurise same and deploy the blank into an inflated double-skinned bottle that is either self-sealing or otherwise sealed-off to maintain its erected shape; a beverage dispensing unit connected to the temporary storage facility and arranged for dispensing a metered amount of said beverage received from said storage facility through a beverage dispensing spout which is arranged to be in selective engagement with a liquid filling opening of the double-skinned bottle whilst the latter is being inflated or after being fully erected and sealed; a bottled beverage dispensing station adapted to receive and/or hold the beverage-filled, inflated bottle and make same available for removal by a consumer; and a housing within which all of the afore mentioned devices, units, apparatus and station facilities are contained.

It is conceivable to dispense with the filtering and/or purification device and the flavouring/carbonation unit in such countries where conventional tap water is of high potable standard and where the beverage to be dispensed to a customer in the inflated bottles is pure water. The essential components of the dispensing system are thus the storing facility for holding a plurality of deflated bottle blanks, preferably still forming part of a roll or folded pack of joined bottle blanks which are separated at or immediately prior to the inflation station, the bottle inflation unit for inflating the bottle blanks and the beverage dispensing unit for filling the bottle with a predetermined/metered amount of beverage. The inflation unit and the beverage dispensing unit can be co-located at the bottle inflation station to effect simultaneous or time-delayed filling of the bottle with beverage and inflation thereof; the bottled beverage dispensing station may equally be dispensed with or be co-located with the inflation station.

It will be appreciated that the bottled beverage dispensing machine can also incorporate heating and cooling units arranged to cool or heat the beverage prior to or after being filled into a bottle; equally, the inflation fluid can be a heated or cooled gas, to assist in maintaining or imparting a desired temperature to the bottled beverage.

This aspect of the invention can be incorporated in point-of-sale vending machines at restaurants, bars or any venues where a tap water connection is available, wherein a plurality of such inflatable bottles can be stored in space saving manner, wherein a single bottle can be erected upon request by a person wishing to obtain a bottled beverage subsequent to payment being effected and registered by a suitable payment validation unit (eg coins, bank notes or credit card reader facility), whereby such erected bottle is then filled with a suitable beverage and dispensed to a collection station at the machine. As noted above, different types of beverage dispensing/vending machines are known which produce on demand a beverage from water and flavouring agents and dispense same into a cup; modification of such machines through incorporation of the above described optional and essential units required to effect inflation and filling of the inflatable double-skinned bottles should be within the normal skill set of people engaged in design and manufacture of such equipment. Because the plurality of bottles that may be filled with beverage bottles are received in deflated state on a roll or in a multi-fold cassette located within the machine housing, such vending machine in accordance with the inventions is capable of holding much larger quantities of self-erecting bottles than conventional beverage vending machines or refrigerators of equivalent size can hold conventional rigid and semi-rigid bottles.

For bottled water in particular, the present invention dramatically reduces the cost of transport and storage of the water, as well as encouraging recycling through easier collection and handling of used bottles. In the event of bottles being dumped, significantly smaller volumes of landfill are required.

In a further, alternative aspect of the present invention, the concept of providing an inflatable, rigidity enhancing exoskeleton is used in devising an insulated, inflatable box blank, rather than one which is bottle-shaped, which can be erected by inflation of the blank at a point of sale or required use. The contents of such 'self-erecting' boxes would typically be solids, although small quantities of fluids can be accommodated. Such self-erecting insulated boxes can be used to replace rigid and semi-rigid polyurethane foam boxes and similar containers of expanded materials used for conveying perishable goods that require temperature control during short-term storage or transport. Seafood is an example of such goods. As in the case of the bottle, such inflatable boxes can be supplied on a roll or in a cassette and are erected by inflation with air or gas supplied from a dispensing machine. The dispensing machine (and the inflatable blanks it contains) is relatively small and occupy a much smaller volume than the stock of conventional insulating boxes they replace. Such insulated, inflatable boxes are therefore of considerable benefit to the provider of the perishable goods in saving expensive floor space, often in retail situations. They are also of considerable benefit to the end user, in that they collapse for easy disposal, after use, to a very small volume compared with the polyurethane foam and similar expanded materials that they replace.

A preferred embodiment of an inflatable, double skinned bottle blank will be described in more detail in the following description together with an embodiment of a method of manufacturing such bottle, with reference to the accompanying drawings.

BRIEF DESCRIPTION OF THE DRAWINGS

FIGS. 16 to 18 are respective schematic top plan views of the mouth piece of FIG. 15, illustrating a tamper-evident seal flap;

FIGS. 22a to 22c are schematic side views showing deployment of the tamper evident seal during inflation of the bottle of FIG. 2.

DETAILED DESCRIPTION OF PREFERRED EMBODIMENTS

Figure 1:
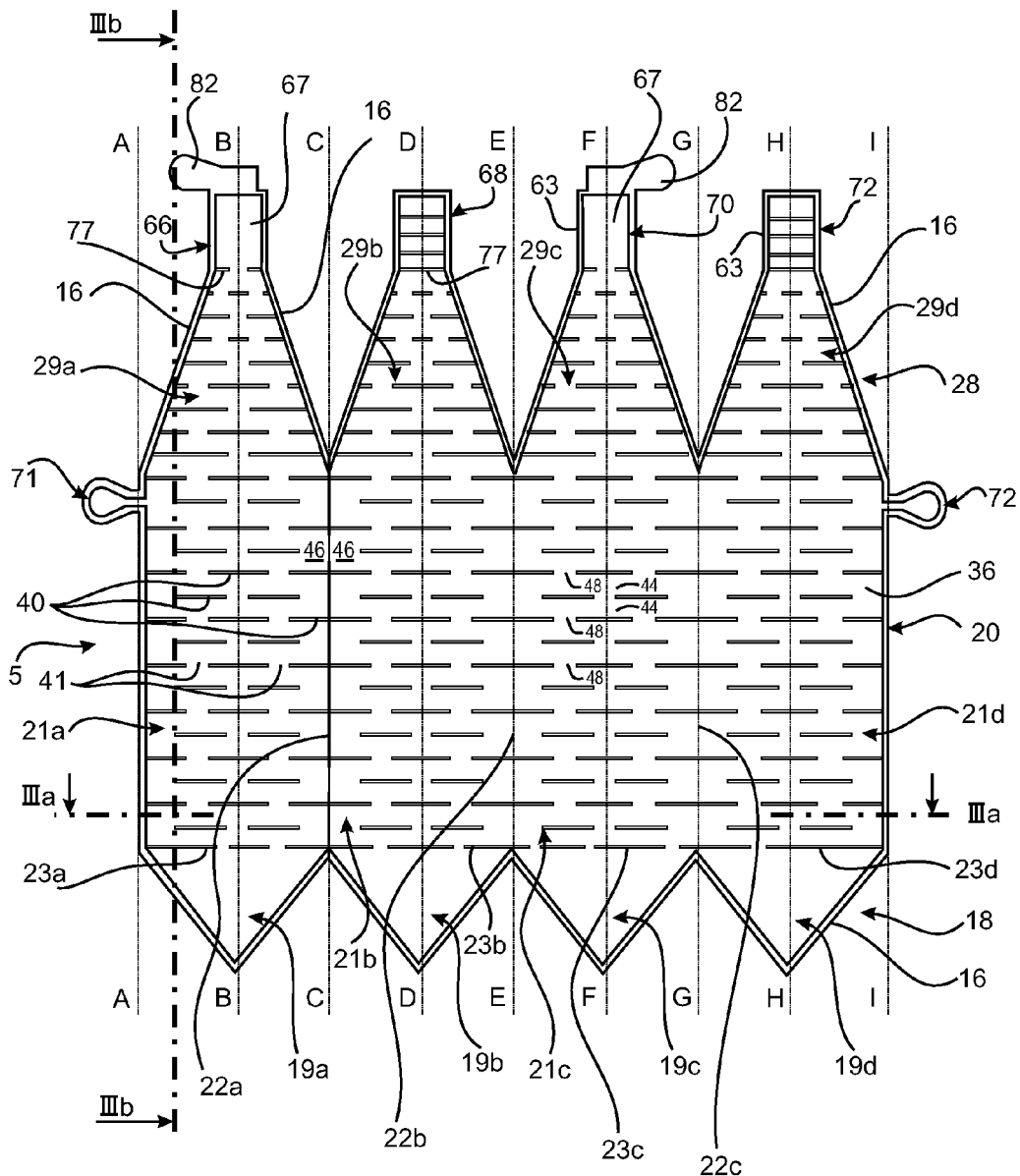
FIG. 1 is a plan view of a double skinned blank of liquid impermeable plastic foil materials which, once folded and welded along selected free edges, and inflated, will form a bottle in accordance with an embodiment of the present invention.
Figure 2:
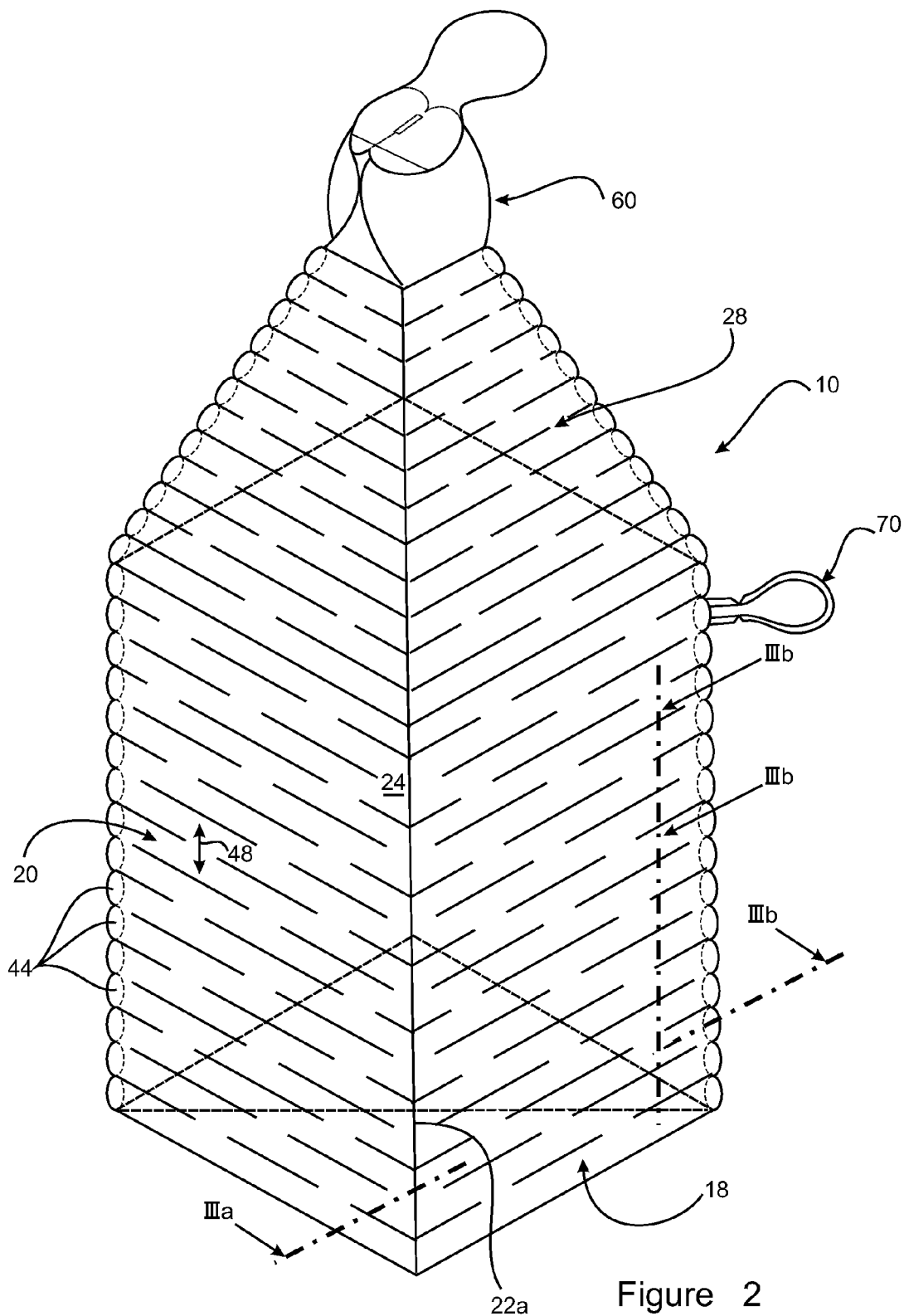
FIG. 2 shows a schematic isometric depiction of a bottle erected (manufactured) using a blank as per FIG. 1, in accordance with the present invention.

Turning first to FIGS. 1 and 2, FIG. 1 shows a plan view of a double-skinned blank 5 which after further folding and selectively edge-bonding at specific perimeter locations of the blank 5, as explained below, is transformed/shaped into an inflatable bottle blank which in turn can then be inflated into a deployed state as is schematically illustrated in the simplified isometric depiction of bottle 10 in FIG. 2. The different stages of manufacturing the blank 5 of FIG. 1, the folded and bonded bottle blank (not shown) and subsequent filling operations to inflate the collapsible double-skinned walls of the bottle 10 to make same a relatively shape stable and rigid bottle (as per FIG. 2) and to fill the bottle itself with a beverage (eg water), will be addressed in turn in the following description.

The bottle 10 in FIG. 2, shown in inflated state, is of polyhedral configuration, quadrilateral (eg square) in cross-section. It has a square bottom wall 18 (standing base of bottle) comprised of four isosceles triangular flaps 19a-19d (see FIG. 1) which, after blank 5 is folded as described below, are sealingly welded to one another along the perimeter lines located between reference lines AA to II. A peripheral wall 20 upstanding from base 18 is made up of four, essentially planar, but stiffener-structured rectangular wall panels 21a to 21d. A top or neck-portion wall 28 of container 10 is comprised of four triangular, essentially planar panels 29a to 29d which, as is the case with the bottom wall flaps, are bonded to one another along the free perimeter edges either side of reference lines C-C, E-E and G-G, and sideways of ref lines A-A and I-I. At top wall (or neck) 28, bottle 10 comprises a double function spout, located in upward extension of the apicis of the triangular panels 29a-29d, serving as both a self-sealing filling and mouth piece 60 through which a liquid may be filled into bottle 10 as well as subsequent dispensing of the liquid through a valved-dispensing orifice, as will be detailed below. Walls 18, 20 and 28 define or envelope an internal bottle cavity/chamber 24 for holding the liquid filled into the bottle 10. Finally, and as explained in further detail below, two tab portions 71 and 72 which protrude from the perimeter on opposite sides of the blank 5 will form, when the bottle blank is finalised, an inflation arrangement 70 with integral one-way inflation valve and deflation facility.

Figure 3:
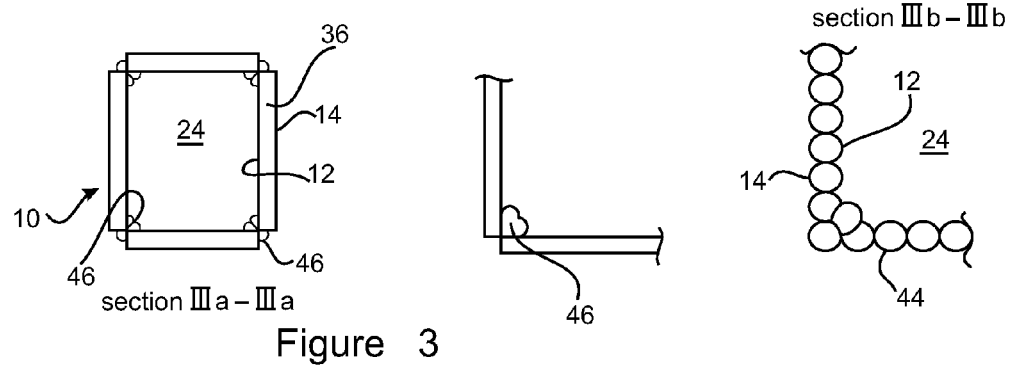
FIG. 3 shows enlarged cross-sectional, schematic views of the bottle of FIG. 2 along line IIIa and IIIb in FIG. 2 (see also lines IIIa and IIIb in the unfolded or 'blank' view of the bottle, in FIG. 1)

All walls 18, 20, 28 of bottle 10 are contiguous to one another and double skinned, ie these have a cavity-facing and an exterior-facing skin 12, 14, respectively, as illustrated in the cross-sectional detail of FIG. 3. In a deflated state, skins 12, 14 will be touching or lying next to one another, but in a deployed, inflated state of bottle 10, as per FIG. 2, an inflation cavity 36 will be defined between the skins 12, 14 at each wall 18, 20, 28. The bottle skins 12, 14 are 60 to 100 micron thick and made of low density or high-density polyethylene (LDPE or HOPE) sheet material, combined with a gas barrier film in a laminate construction. The wall thickness, in inflated state of the bottle would typically be 5 mm, noting that the drawings are not to scale, but illustrative only (and thus in part exaggerate the contours)

In the embodiment illustrated, the whole of the bottle 10 is preferentially manufactured solely from two sheets 12, 14 of said plastic material which are overlaid on one another to provide the skins (wall). The sheets are selectively welded to one another along joins extending along the contoured perimeter line 16 of the sheets 12, 14, as well as within the confines of said perimeter, along part of panel lines 22a-22c that notionally separate the upright peripheral wall 20 into its four panels 21a-21d, panel lines 23a-23d which run between the bottom of side wall panels 21-21d and respectively adjoining bottom wall panels 19a-19d, and a pattern or grid of additional, discrete (ie of limited extension) stiffening lines or seams 40, as is exemplarily illustrated in FIG. 1; additional join/weld lines are also present, as explained below with reference to other figures, in particular in the bottle's mouth piece 60 and the bottle inflation arrangement provided by tab sections 71, 72. All lines in FIG. 1, including the line immediately inside around the entire perimeter of the blank used in making the bottle 10, thus represent weld lines or locations between the two (coplanar) sheets of plastic that form the bottle 10; in FIG. 1, one sheet of plastic is shown covering the other sheet congruently. It will be noted that the weld/seam lines within the perimeter 16 are either staggered or interrupted, ie not continuous, so that there is communication within the double skinned wall structure 12, 14 between the panels 21, 23 and 29 that make up the bottom, side and top walls 18, 20 and 28, thereby to provide communication between the different sections of the wall's inflation cavity 36 across the entire bottle.

In the present invention, the shape, orientation and density of the so-called stiffening weld lines or seams 40 between the inner and outer skins 12, 14 may be chosen to suit the size of the bottle 10 and its contents and a variety of choices are possible. However, for a bottle with planar side walls, the pattern of welds 40 is preferentially similar to that shown in FIG. 1. Said welds 40 consist of preferentially horizontal straight line welds, with interruptions along the lines as shown in the illustration of FIG. 1. The ratio of weld to interruption of weld along any one horizontal straight line of welds is preferentially approximately 3 to 1, although other ratios can be used, depending on this shape and size of the bottle.

By providing the grid of parallel, horizontally spaced-apart weld lines 40 with interruptions 41 along their extension, in which, the interruptions 41 are staggered such that they do not overlap in vertical direction of the bottle (or blank 5), there is created a pattern of orthogonally intersecting, inflatable stiffener structures, ie horizontally extending ridges 44 and vertically extending 'micro' columns 48 that give the bottle's side walls, as well as the bottle itself, when inflated, rigidity and shape-stability. When viewing the inflated bottle standing on its base, said pattern of stiffening welds 40 has the effect of creating inflated horizontal ridges whose shape is mostly dictated by the horizontal welds. Said pattern also creates inflated vertical micro-columns at the interruption of said horizontal welds.

This arrangement of horizontal ridges and vertical micro-columns not only within the upright peripheral wall 20 but, in the embodiment depicted, the top wall 28, thus effectively define an exoskeleton structure about the bottle's internal cavity 24; the exoskeleton is characterised by multiple, intersecting, 'discrete', inflated structures that are interconnected around the bottle, made up by the sheets 12, 13.

When inflated, both ridges 44 and micro-columns 48 tend to straighten under pressure such that the inner and outer skins 12, 14 are not only overall in tension, but differentially tensioned within the individual wall sections or panels. This tends to produce straight, vertical micro-columns and straight, horizontal ridges, such structures being constrained by the geometry of the bottle. Overall, the horizontal ridges 44 act to produce rigidity horizontally across each face of the upright wall of the bottle and the faces of the top wall of the bottle; the micro-columns 48 link ridges 44 together vertically by interrupting the hinge created at each weld 40 between adjacent ridges 44. The staggering of micro-columns is best understood by moving along any one ridge 44, in that if a first micro-column 48 connects said ridge with the one below, the next micro-column will connect said ridge to the ridge above. The subsequent micro-column will connect the said ridge to the ridge below again, and so on.

Figure 4:
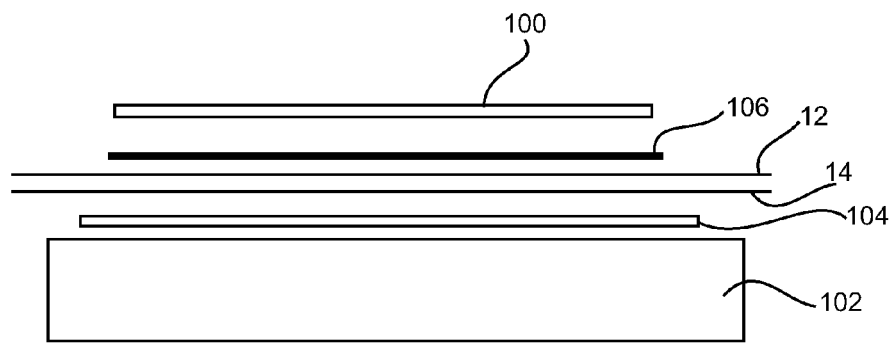
FIG. 4 is a schematic side view of a welding die for manufacturing single blanks as illustrated in FIG. 1.

As noted, the square bottle 10 shown in FIG. 2 has four side wall panels 21a-21d, delineated at vertical weld lines 22a-22c of blank 5 of FIG. 1 and the joint weld once the free vertical edges of panels 21a and 21d are brought together and welded, as explained below. Unless other provisions are made, these welds between adjacent, upstanding wall side panels 21a-21d would tend to act like film hinges and the inflated bottle would not maintain the desired, square cross-section on inflation; the bottle could be 'squeezed' to attain (and keep) a rhombus cross-section. It will thus be noted that in order to counter such disposition, the horizontal stiffening welds are interrupted such that upright columns are present on either side of each vertical weld line 22a-22c, and at the vertical portion of perimeter line 16, thus defining, when the bottle is inflated, stiffening edge columns 46 along the edges of the welds between faces which columns have a larger diameter or inflation volume than the other vertical micro columns 48 and therefore act like inflated tubular pillows pushing on each other as illustrated in the right-hand detail of FIG. 3. Preferentially, said special-purpose columns 46 each span two ridges as do any other micro-columns 48 on the surface of the bottle, however, the horizontal width of said special purpose columns is typically larger than the width of standard microcolumns on the rest of the bottle as illustrated in FIG. 4. The width of said columns will vary with the specifics of the design and shape of any one individual bottle and the number of faces of said bottle.

Size and shape of the columns 46 located adjacent the vertical joins 22a to 22c (and the join AA-II when the side wall panels 21a and 21d are adjoined) are selected to strongly force the side wall panels 21a-21d of the bottle to make an included angle between the adjacent panels significantly more than 90 degrees at the weld between them, if the faces are not otherwise constrained by the geometry of the inflated bottle. Equally, such edge stiffening columns 46 between discrete wall panels may be required along with the vertical welds on the neck of the bottle depending upon individual bottle design. It will also be noted that the bottle illustrated in FIG. 2 does not contain an exoskeleton in the base; however inflated areas may be used in the base for insulation and to assist the bottle in standing in a normal position for a bottle. That is, inflated feet which are part of the exoskeleton, could be included in the base of the bottle as an option.

Two ways in which a double skinned blank 5 can be manufactured will be described with reference to FIGS. 4 to 6. In the simplest form; a reciprocating press can be used, as schematically illustrated in FIG. 4. A flat metal die plate 100, preferentially steel or aluminum, is constructed containing the required pattern of weld lines/joins illustrated in FIG. 1. The pattern is raised in high relief above the surface of the die by a minimum of 2 mm. The die plate 100 may be milled out of aluminum stock to a depth of at least 3 mm and preferentially 4 mm. The die plate 100 can be suitably heated by heating elements (not shown) to the required welding temperature. This temperature depends upon the plastic material to be welded. The die plate 100 can be mounted to a press (not illustrated) such that it can be pressed against a base or ambos plate 102, whereby a silicon rubber sheet 104 and a Teflon (PTFE) sheet 106 are interposed between the inserted two sheets of plastic film 12, 14 to be welded together at a pressure, temperature and for a period of time appropriate to the material chosen; the silicon rubber sheet 104 is intended to accommodate minor variations in the flatness of the heated die. The thickness and resilience of said silicon sheet depends upon the actual die but is typically of the order of 3-6 mms.

The reciprocating press method produces one weld pattern for each press of a single impression die. The plastic sheets 12, 14 to be welded are fed in from one side of the press to a position below the die. The die is pressed down and the weld is made. The die is then moved upwards freeing the bonded plastic sheets which are then transferred to a second press where cutting (blanking) of the perimeter of the double skinned blank 5 (as per FIG. 1) and removal of unwanted plastic material is achieved. Operation of this press is identical to the welding press, except that the die could be a straight cutting die or a heated cutting tool for melting the plastic and therefore cut it. Unwanted material is removed preferentially by vacuum to waste.

Figure 5:
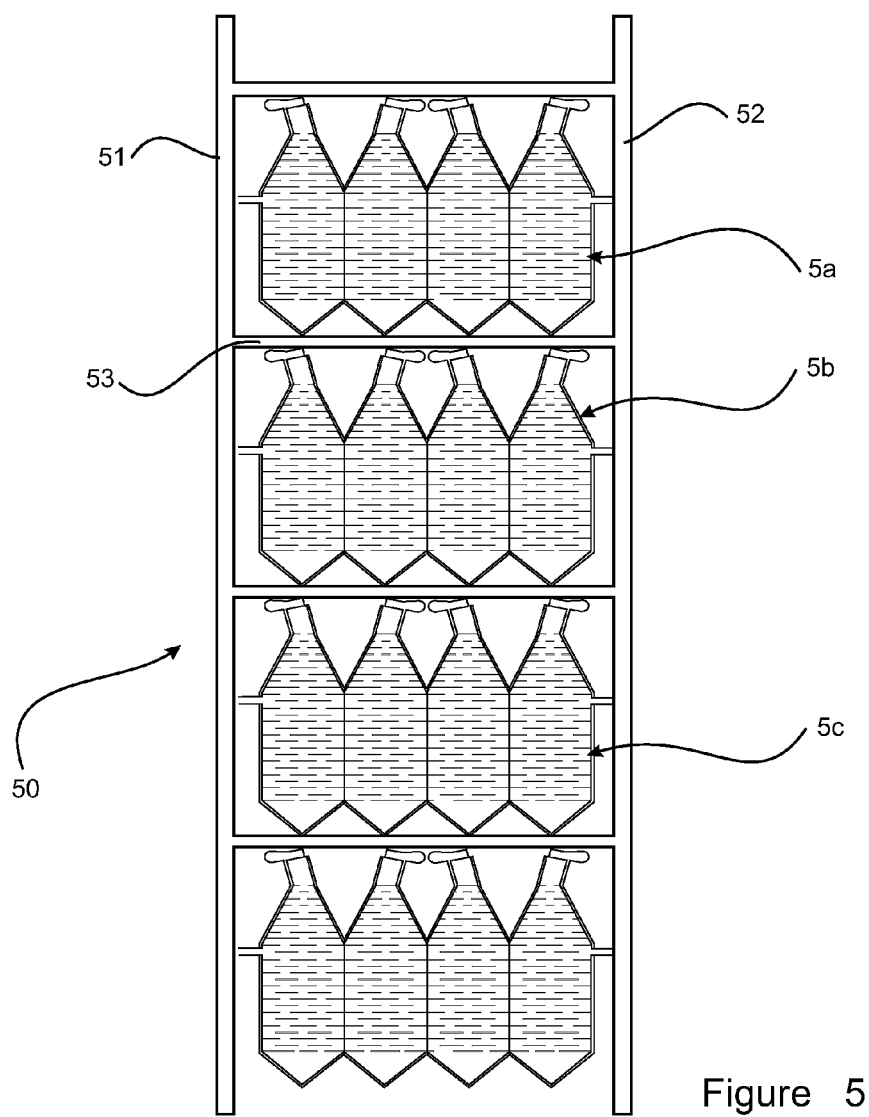
FIG. 5 is a plan view (simplified) of a length of strip material carrying a plurality of successively arranged blanks as per FIG. 1

It is desirable to 'imprint' a series of successive double skinned blanks 5a, 5b, 5c, etc onto a continuous film of plastic material, as is schematically shown in FIG. 5, which shows in plan (top) view a portion of a roll stock material 50 comprised of/imprinted with a plurality of unfolded, double skinned blanks 5a, 5b etc (such as the one illustrated in FIG. 1) joined together end to end, through intermediate spacer strips 53, and between widthward-located side edge or guide strips 51, 52.

Figure 6:
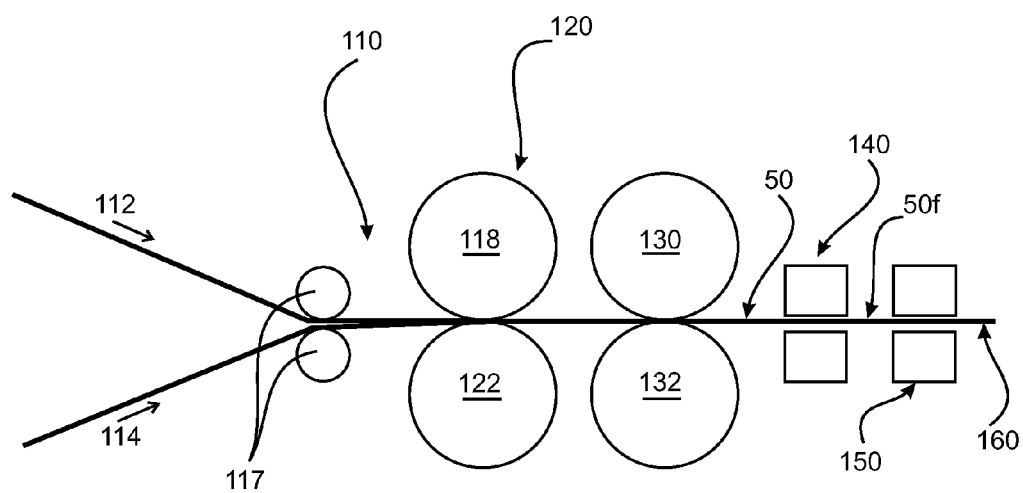
FIG. 6 is a schematic illustration of a thermal welding and cutting machine, with folding and welding stations disposed after the machine, for manufacturing a continuous strip of joined bottle blanks as per FIG. 5.

Equally, instead of using a reciprocating type press, one can use a rotary welding press 120, as is schematically shown in FIG. 6 as part of a thermal welding and blanking machine 110. In such process, one continuous sheet 112 of plastic film is dispensed from a roll into an entry station with opposing guide or nipp rollers 117 where it is joined by a second sheet of plastic film 114 also dispensed from a roll, such as to have one sheet of plastic lying on top of the other in a controlled manner. The face-adjoining sheets 112, 114 are directed to a rotary welding die cylinder 118 containing one or else an integral number of the desired welding patterns per single revolution of die cylinder 118. Said welding die 118 is appropriately coated to avoid the welded material sticking to the metal die. A pressure roller 122 immediately underneath the heated welding die, coated with silicon rubber or other suitable material to accommodate small imperfections in welding die 118, provides counterpressure during welding. Welding can be effected ultrasonically or through simple thermal pressing. After welding, the selectively joined sheets 112, 114 are then conveyed to a rotary contouring or blanking die cylinder 130 having a suitably equipped cutting drum 132 and a counter pressure or anvil drum 134, where the double skinned stock is blanked into the desired multi-flap blanks; unwanted material is continuously removed by vacuum to waste as it is cut-off.

There are numerous commercially available systems to achieve this blanking operation and further details of such devices are not shown in FIG. 6; the processes for implementing the welding and cutting (or blanking) operations are well known in the carton/pouch manufacturing industry; the speed, temperature and pressure of the rotary dies can be easily adjusted to suit the material of the sheet material used in manufacturing the inflatable bottle blanks.

The result of either the reciprocating or continuous flow processes described above is a continuous double skinned sheet of plastic film 50 containing multiple impressions (or blanks 5) for manufacturing bottles 10 out of the continuous strip of such blanks. As illustrated in FIG. 5, each blank 5a, 5b, 5c etc is joined to disposable guide strips 51, 52, with the strips 51, 52 preferentially containing regularly spaced sprocket holes to allow easy and precise process control within the thermal welding and blanking machine 110. Preferentially, there will also be disposable spacer strips 53 between the base of one bottle 5a and the mouth of the next bottle 5b, etc, but these are not essential. Any join between a disposable guide strip 51, 52 and the unfolded bottle blank 5a, 5b, 5c, or between spacer strips 53 and respective, successive unfolded bottle blanks 5 will have tear-off perforations as is commonly found with paper and plastic sheet products which are torn off a roll. Said perforations are used to ensure easy separation and may be added at an appropriate point in the manufacturing cycle by methods well known to those skilled in the art.

In a subsequent step of the inflatable bottle blank manufacturing process, the contoured, double skinned, continuous strip 50 of blanks 5 that emerges from the blanking stage 130 of the thermal welding and blanking machine 110 is folded in a folding station (only schematically indicated at 140 in FIG. 6) in accordance with a pattern that will be explained with reference to FIG. 7, and selectively welded at a welding station (only schematically indicated at 150 in FIG. 6) to form a strip of bottle blanks 160 (as compared to the single plane strip of blanks 5 of FIG. 5), as will be described with reference to FIGS. 8 to 11. This is preferentially done as part of a continuous folding process using guides to deflect and orientate selective portions of the strip material 50. Such folding processes are well established in the current state-of-the-art and are not described in detail. The object of said folding processes is to bring all of the free perimeter edges of the blanks 5 that need to be welded into contact, simultaneously. Once folded such that said edges are in contact, the folded strip 50f will be directed through the welding station 160 to finalise the bottle blanks, as described below.

It is noted that the folds made during this process are made about (vertical) folding lines A-A to I-I referenced in FIG. 1, which lines are parallel to the direction of movement of the continuous strip 50 of blanks 5a, 5b etc through the folding machine 140. Said lines about which the folds are made are described by letters A-I as appear in FIGS. 1 and 7. Fold M, for example, describes a fold line running along line A-A from the top of the blank 5 to its bottom.

Figure 7:
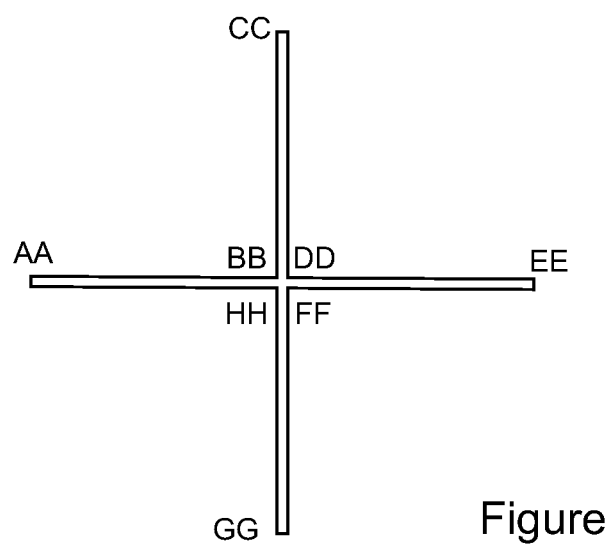
FIG. 7 is a schematic illustration showing the folding pattern (in end view) required to form and weld the blank of FIG. 1 (and blanks strip of FIG. 5) into a deflated bottle blank.

The folding pattern illustrated in FIG. 7 is an end-on view which may be visualised as the strip 50f entering the paper on which this figure is drawn with the mouth of the bottle inside the paper and the base towards the viewer. The view shown in FIG. 7 is a section taking through the strip in the main part of a blank 5, near the base, after folding, and does not show the inflation tabs 71 and 72 or disposable side strips 51, 53. A section taking through the neck 28 of the bottle 10 would have the same pattern as in FIG. 7 but would necessarily be smaller in accordance with the dimensions of the neck at the point at which this section was taken.

The individual blanks 5 within a strip 50f are folded into a cross-pattern: Commencing at edge AA, the blank is folded along line BB at right angles such that line CC is up the page. Edge CC is then folded 180° to bring Line DD adjacent to line BB. The blank is then folded at right angles at line DD such that line EE comes to the right-hand side of the paper. Line EE is folded 180° to bring line FF adjacent to DD. The blank 5 is then folded at FF at right angles to bring GG down the page, whereupon the blank is then folded, 180° at line GG to bring HH adjacent to FF, and subsequently folded at right angles at HH to bring II adjacent to AA. This folding may readily be achieved by using guides that direct the continually moving strip of blanks.

It will be observed from FIG. 7 that the blank 50f is folded outwards at the centre line of each side wall panel 21a to 21d, along a line parallel to the vertical welds 22a to 22c between the adjacent panels 21a to 21d of the blank shown in FIG. 1. In the case of a four sided bottle, the angle for each such fold is 90°. The folds at CC, GG and EE are all 180°, thus bringing the required edges into contact. No fold is required at AA-II as these are the outer edges of the blank and are not joined prior to folding and are merely pressed together. The folds at CC, GG and EE are inwards, that is, the edges of each fold are towards an imaginary line drawn from the centre of the mouth of the completed bottle to the centre of the base.

As noted, each blank 5 (or the strip 50 of contiguous blanks 5a, 5b, 5c etc as per FIG. 4) is folded in a star pattern strip 50f that has eight faces and which requires 4 sets of welds along those edges of the blank 50f that are not already joined, ie the perimeter edges were joined when manufacturing the double skinned blank 5.

Figure 8:
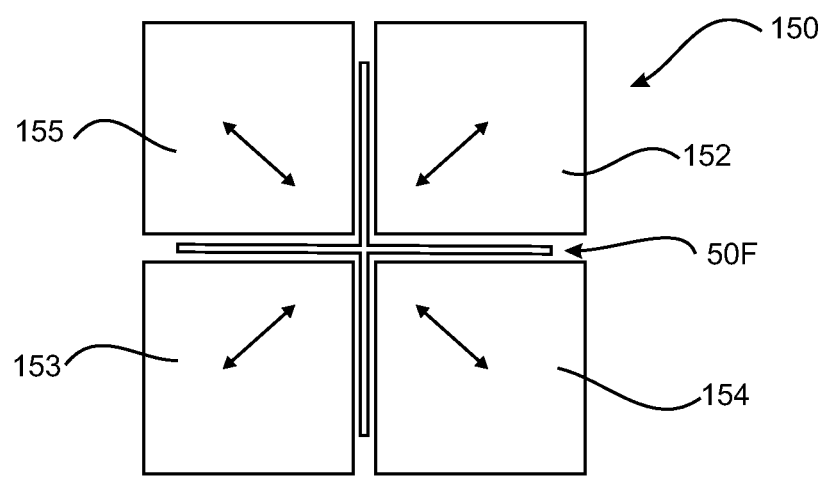
FIGS. 8 and 9 are schematic representations (in end view similar to FIG. 7 and isometric, respectively) of components of a first embodiment of the welding station illustrated as part of FIG. 6.
Figure 9:
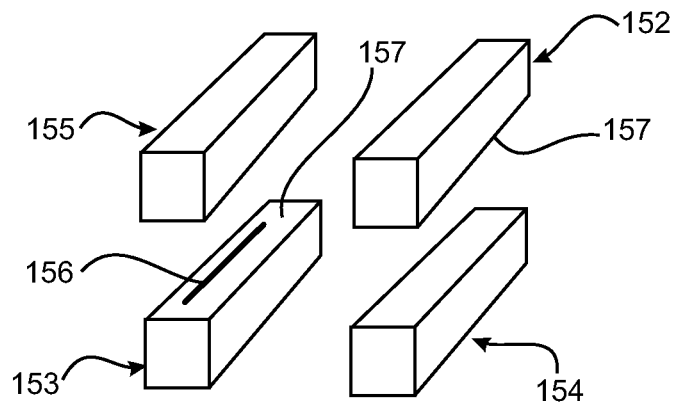

FIGS. 8 and 9 illustrate schematically one way in which welding of all free perimeter edges can be effected simultaneously in welding station 150, using four separate welding blocks 152-155 to, press simultaneously on all the edges to be welded. FIG. 8 is an end view of the welding blocks in the direction of travel of the blanks strip 50, akin to FIG. 7, showing a folded blank 5 as it is located between the encircling blocks 152 to 155. For convenience, two of these welding blocks 152, 153 are chosen to do the welding while the other two 154, 155 are used to provide reference surfaces to press against, noting that, a variation of such arrangement is easily devisable, eg all blocks may contain part of the welding lines required to effect edge welding. To this end, all blocks 152-155 are preferentially made from thermally stable and insulating quadrilateral plastic rod material, such as PTFE. Flat strip Nichrome wire 156 is embedded in but slightly proud of the engagement surfaces 157, 158 of the blocks 152, 153 in a pattern that corresponds to the welds required.

Using mechanisms well known to those skilled in the art, the folded strip 50f of blanks 5a, 5b etc is passed between the four blocks 152-155 and located accurately against welding surfaces 157 on blocks 154 and 155. The motion of the strip of blanks is halted and said blocks are pressed firmly inwards, as shown by the diagonal arrows in FIG. 8. The nichrome wire is heated to a temperature required to perform the weld using a controlled electric current for a controlled period, using techniques well known to those skilled in the art. The exact pressure, temperature and time depend upon the plastic film material used and the shape and size of the inflatable bottle blanks to be made. Once all required weld lines have been completed, the blocks 152-155 move outwards and the strip of now formed bottle blanks moves on so that the process can be repeated and the next bottle blank can be welded. The mechanisms for moving the blocks 152-155 in and out are not detailed, and there are many simple ways of doing this, known to those skilled in the art.

Figure 10:
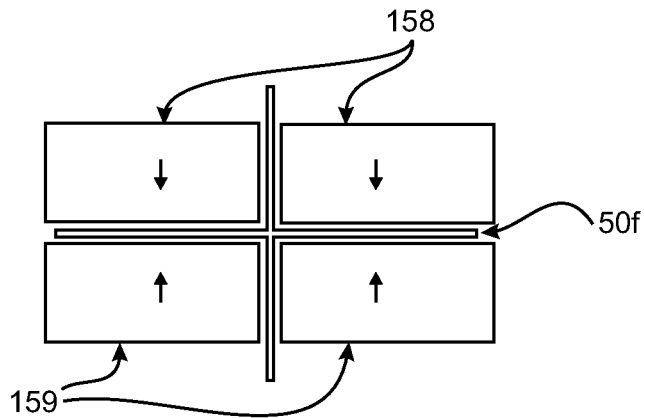
FIGS. 10 and 11 are schematic representations (in end view similar to FIG. 7) of components of a second embodiment of the welding station illustrated as a block unit in FIG. 6.
Figure 11:
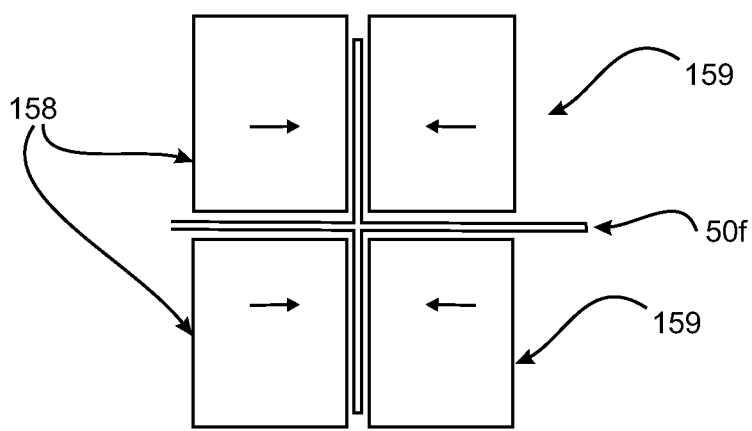

The reciprocating-type welding process at station 150 can be replaced with a continuous process using heated welding rollers 158 containing the requisite welding patterns, acting against respective pressure rollers 159. To achieve the welds required in the example shown in FIG. 7, would require eight rollers, one for each face of the double skinned bottle blank, with the rollers arranged in pairs. Such arrangement is schematically illustrated in FIGS. 10 and 11.

Following the completion of the welding, the now created inflatable bottle blanks are then folded flat using guides, for example, by bringing edge CC to be adjacent with AA and edge GG to be adjacent with edge EE. At this stage, and noting the measures below which are specific to imparting welding lines/seams onto the flaps that provide the mouth piece 60 and inflation arrangement 70, described below, the manufacturing process to provide stock material comprising a plurality of end-to end joined, inflatable double skinned bottle blanks is complete, with the bottles blanks flat on a continuous strip. This strip may inturn be wound onto on a roll or folded in a multi-fold or Z fold cassette for subsequent use, eg in a bottled-beverage dispensing machine, as described above under the heading 'summary of invention'.

The above description relates to the manufacture of a 4-sided, inflatable bottle blanks strip. The same process may be used for any number of sides equal to or larger than three in number. The folding required for bringing adjacent edges into contact uses the same principles as described above, although the number of folds and the angles will vary with the number of sides of the bottle. In principle, the centre line of each face must be folded outwards at an angle, which is 360° divided by the number of faces of the bottle around the circumference of the bottle, assuming that these faces are symmetrical and of the same size. Each edge required to be folded for welding is folded 180°, thus bringing the edges needing welding to be adjacent. For an "n" sided bottle, there will be "n" 180 folds.

Turning then to the integrated bottle inflation arrangement 70 which is provided to enable inflation and erection of the bottle blanks (ie the folded and selectively welded blank 5 of FIG. 1). It will be immediately appreciated that whilst it is preferred that the exoskeleton of the bottle blank (provided by the grid of inflatable stiffener ridges and columns 44, 46 and 48 formed within the double skinned walls of the bottle) will have a common inflation path shared by all parts of the exoskeleton in connection with the inflation cavity 36 defined between the double skinned walls, such that a single inflation arrangement 70 may be provided. For larger bottles, however, said exoskeleton could be compartmentalised if desired; in such case, a number of inflation arrangements 70, as now will be described, would be required. In the embodiment of FIGS. 1 and 2, there is only one inflation valve arrangement 70, as there is only one closed wall cavity associated with the exoskeleton.

A suitable inflation valve is a valve permitting the passage of air, gas or fluid in one direction only. Said valve checks any reverse flow on removal of the source of inflation and substantively holds the pressure achieved by inflation in the exoskeleton for the required life of the bottle. Since the bottle is a disposable item, it is also desirable that said inflation valve should readily be able to be released or broken off by hand to allow the bottle's exoskeleton (and therefore itself) to collapse after use to minimise recycling costs, garbage collection, transport and land-fill.

Figure 12:
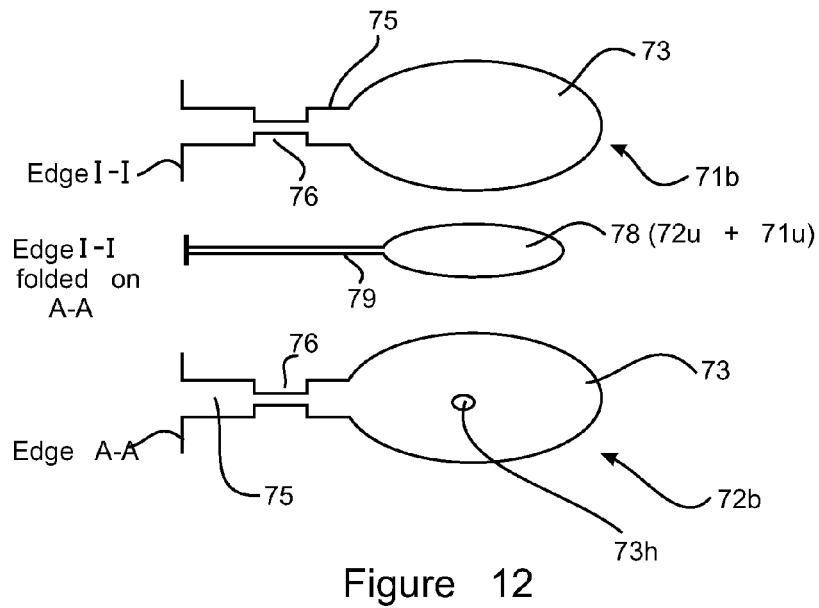
FIG. 12 is an exploded top plan view of the components that make up a check valved inflation arrangement for the bottle of FIG. 2.
Figure 13:
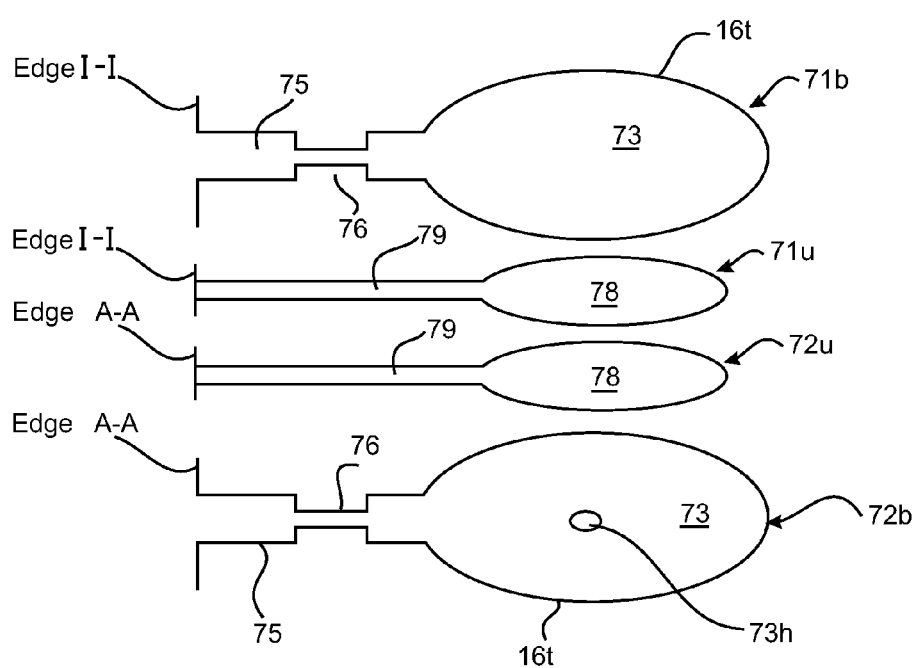
FIGS. 13 and 14 are schematic illustrations depicting different stages of forming the check-valved inflation arrangement for the bottle of FIG. 2.
Figure 14:
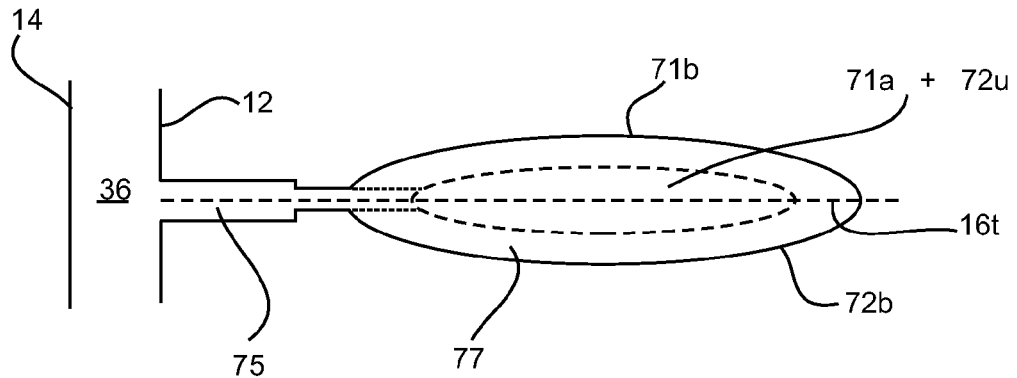

The preferred valve described below has the advantage of being able to be constructed simultaneously during the bottle blank manufacturing process previously described, albeit, requiring some dedicated steps. The movable valve component itself is contained inside a perimetrically sealed inflation tab 70 which consists of the flaps 71 and 72 welded at their perimeter edges, but otherwise in fluid connection with the inflation cavity 36. In the illustrated embodiment, tabs 71, 72 comprise an oval contoured end portion 73 connected to the remainder of the sheet via a straight band portion 75, thereby being of a size and shape allowing it to be readily gripped by the thumb and a finger with one hand, and torn-off the bottle so as to provide a simple deflation mechanism for deflating the exoskeleton when the bottle is no longer required. This is assisted by weak-points (eg a wasted portion within the straight band portion) designed into the tab configuration and its joint to the exoskeleton. FIGS. 12 to 14 show the components of the valved inflation arrangement 70 in exploded and assembled views, as the valve is formed in several stages.

During manufacturing of the double skinned blank(s) illustrated in FIGS. 1 and 5, tabs 71*b*, 71*u* and 72*b*, 72*u* are left standing on opposite sides of each lower and upper sheet 12, 14, and therefore blank 5 as illustrated in FIG. 1, along edges AA and II so as to form part of the perimeter line 16, see FIG. 13. It is noted here that there are two overlying tab portions at each side, 71*b*, 71*u* and 72*b*, 72*u* lying coplanar on top of each other in the illustration of FIG. 1, which whilst similar in contour are not identical to one another, as noted below; also, these are not welded together during welding of the other parts of the contour line 16 to define the double skinned blank 5; the inflation tab flaps 71*b*, 71*u* and 72*b* and 72*u* on both sides of the blank 5 are kept separated from each other by methods known to those skilled in the art and selectively bonded together as described below at a latter stage of manufacture.

As best seen in FIG. 12, the lower inflation tab 72*b* along edge AA is provided in its oval portion 73 with a circular inflation hole 73*h* punched in it as illustrated. The dimension of this hole is appropriate to the size of the bottle, but is typically not less than 3 mm diameter. The lower inflation tab 71*b* along edge II is of similar size and contour to inflation tab 72*b*. Both tabs 71*b* and 72*b* have a rectangular inflation web 75 that connects with lower sheet 12, which exhibit a rectangular 'waist' portion at 76 that will facilitate tearing-off the inflation tab 70 for disposing of the bottle (ie deflating it). When edges AA and II are folded into the configuration illustrated in FIG. 7 for subsequent welding, the respective lower tabs 71*b* and 72*b* are brought at that time into plane-parallel contour-registering relationship, and welded together along their free perimeters 16*t* to define an inflation chamber 77 as best seen in FIG. 14.

The upper inflation tabs 71*u* and 72*u* alongside edges A-A and I-I of the upper skin sheet 14 of blank 5 in FIG. 1 have (but do not need to do so) a perimeter contour similar to the lower tabs 71*b* and 72*b*, but of reduced area, whereby the distal oval shaped portions 78 are connected by a thin web 79 to the respective edge A-A and I-I of sheet 14 whose width is smaller than the wasted portion 76 of the lower tabs 71*b* and 72*b*. Tabs 71*u* and 72*u* will form a diaphragm structure which when the lower tabs 71*b* and 72*b* are welded together at their contour when the blank 5 is folded as described above in re FIG. 7, will come to lie within inflation chamber 77 to provide a movable valve closure member; upon pressurisation of chamber 77 (and thus the inflation chamber 36 defined between the upper and lower sheets 12, 14 of the bottle walls with which chamber 77 is in communication through the channel formed by inflation webs 75 of lower tabs 71*b* and 72*b* being welded to one another at their longitudinal edges) is able to seal against orifice 73*h* as illustrated in FIG. 14.

An exploded view of the valve constituents is shown in FIG. 12, whereby the lower flaps/tabs 71*b* and 72*b* define the inflation chamber 77 when welded together, and the two upper flaps/tabs 71*u* and 72*u* form the diaphragm inside the valve. These are welded together at a location close to the edges A-A and I-I of blank 5 only at that point. This weld is a separate process and is required to seal the inner chamber or cavity 24 of the bottle 10. It is noted that only one diaphragm is required for the functioning of the valve, and one of them may optionally be cut-off, however, leaving both in place does not affect the functioning of the valve and simplifies sealing-off the bottle cavity 24 by simply welding the two diaphragms together at their bases. This arrangement also has the advantage of allowing the inflation fluid to circulate in both directions around the bottle, upon inflation, as will be described below.

Turning next to the mouthpiece 60 of bottle 10, it will be noted from the illustration of blank 5, that it is an integral part and formed in continuation of the upper wall 28 of the bottle. Given the double skinned, inflatable configuration of the walls of most panels and 'flaps' of the blank 5 of FIG. 1, including some of the portions that make up the mouthpiece as described below, the mouthpiece 60 will be deployed and erected by inflation during inflation of the exoskeleton of bottle 10. Said mouthpiece 60 has a self-sealing dispensing channel configuration ending in a normally closed slit 65 to retain fluid previously filled through the mouth piece into the internal cavity 24, inside the bottle 10, without the need for a separate closure cap such as used on conventional screw-top PET bottles. Further, said mouthpiece 60 is configured to resiliently deform and open the dispensing channel to dispense bottle contents in response to directional pressure exerted on opposite locations about its periphery by teeth, lips or fingers of a person, and return to its sealed state elastically upon said pressure exertion being removed.

Figure 15:
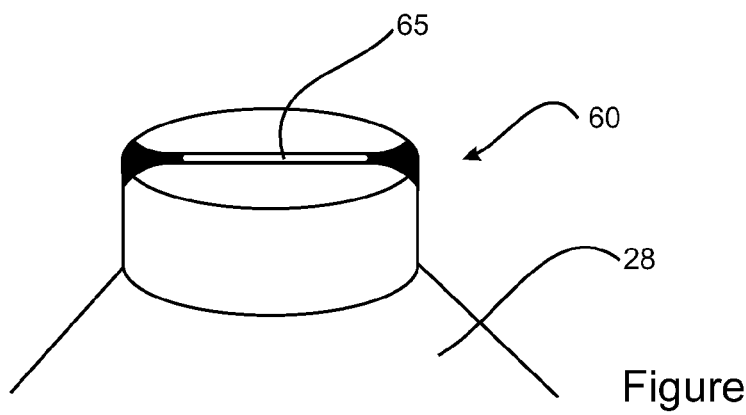
FIG. 15 is a simplified isometric view of the bottle filling and dispensing portion (mouth piece) of the bottle of FIG. 2, showing a dispensing orifice with integrated lip-valve arrangement.

The overall external shape of the inflated mouthpiece 60 is that of a fat, inflated circular or oval cylinder of comparable size to the mouthpiece of most conventional PET bottles used for beverages, as illustrated in FIGS. 2 and 15. In deflated state, the mouthpiece is formed by upper most portions (or flaps) 66, 68, 70 and 72 of the inflatable, double skinned blank 5 illustrated in FIG. 1, compare also FIGS. 16, and 19 to 21, welded together along portions of their respective perimeters 63 as described below. A total of four double skinned flap portions 66, 68, 70 and 72 of blank 5 assemble (ie are folded and then welded) into a mouth piece 60 which, upon inflation of two of the flap portion (66, 70) form a resiliently self-closing dispensing channel 74 (see FIG. 21) between the not-inflatable, identical flap portions 68 and 72 that are folded to face and press against each other, ending in the slit 65 shown in FIG. 15.

Figure 19:
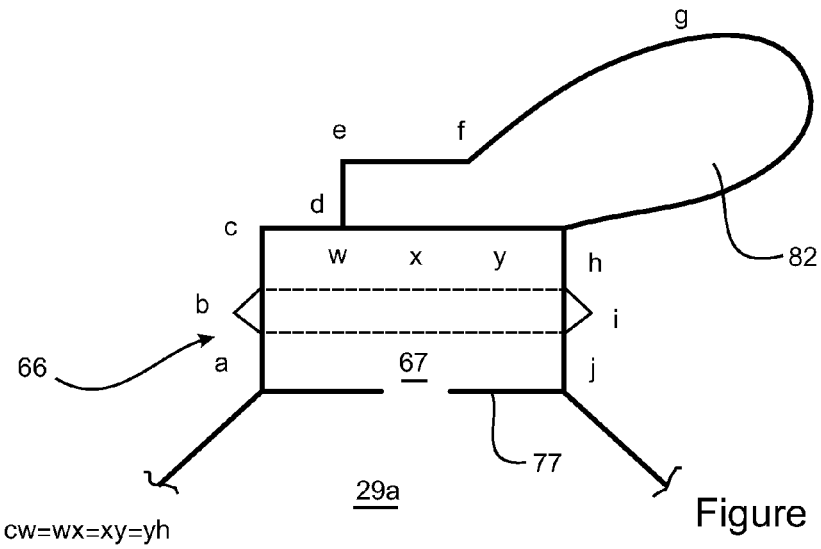
FIGS. 19 and 20 are side elevations, in schematic representation, of those portions of the double skinned blank of FIG. 1 which form two of four flaps to be welded together to form the mouth piece illustrated in FIG. 15.

Inflatable flap portions 66 (and 70), one of which is shown in plan view schematically in FIG. 19, which are identical mirror images of each other, provide the substantive part of the peripheral wall of mouth piece 60, and each define an inflatable rectangular void 67 (when not inflated) between the bonded perimeter line 63 of the facing sheets 12 and 14 (see FIG. 1); half of a tamper-evident seal, as is yet to be described, is formed as a flap 82 on the lower sheet 12 at inflatable flap portions 66 and 70.

There are no micro-columns or ridges within said rectangular inflatable flap portions 66, 70 (as is the case with the adjoining panels 29a and 29c of the top wall 28 of bottle 10), such that the respective, about rectangular voids between the inner and outer sheets (skins) in that zone of the blank 5 inflate pillow-like via one or more micro-columns interrupting the interface welding line 77 between the top wall panel 29a (and 29c) and inflatable mouthpiece flap 66 (and 68) that connect the respective inflation cavities 67 and 36 in the double skinned wall structure (shown in FIG. 3). It is an important although not essential design criterion to provide for an inflation void having equal sided height and width dimensions, to ensure that the inflated mouthpiece provides a properly sealing dispensing slot as described above.

Figure 20:
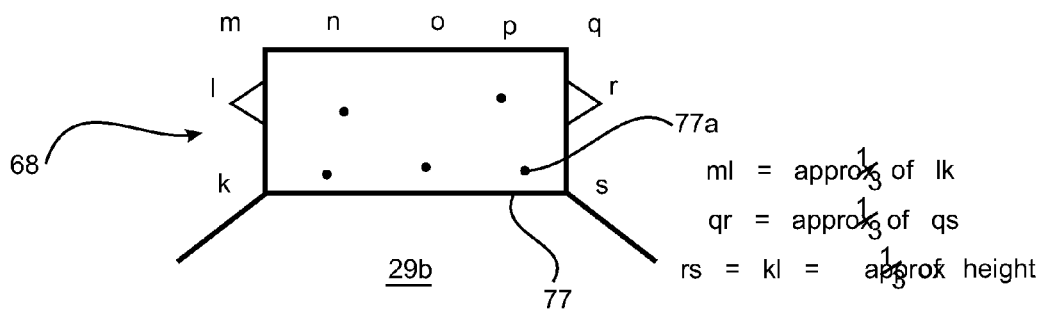

The non-inflatable mouthpiece flap portions 68 and 72 at the top of upper wall panels 29b and 29d, one of which is further illustrated in FIG. 20, are of matching size and contour (or shape) to the inflatable flap portions 66 and 70 (without the seal flap portions 82), but unlike them, the weld line 77 at the interface to the adjoining top wall panel 29b (and 29d for flap 72) is continuous and uninterrupted, so that they are prevented from inflating; ie these flap portions 68 and 72 act merely as double-strength plastic foils to define (or border) the dispensing channel 74; if desired, additional welding dots, as at 77a, may be located to keep the sheets more closely bonded together.

Figure 21:
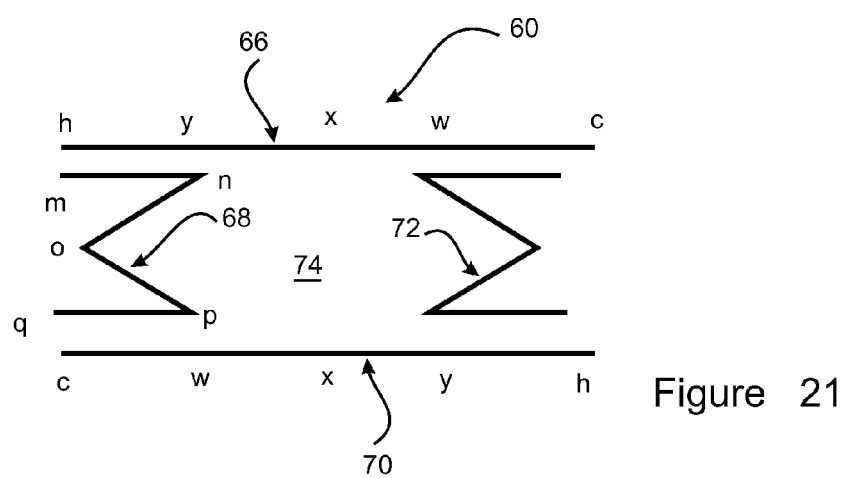
FIG. 21 is a schematic top plan view of the mouth piece portion of the bottle blank, after the double skinned blank flap portions that constitute the mouth piece have been folded but before welding, to illustrate the make-up of the valved mouth piece.

All of these flap components 66 to 72 are folded and welded together normally as for other components of the bottle previously described, but additional welding operations are carried out at the end, as may be best understood as follows with reference to FIGS. 19, 20 and 21. FIG. 21 is a schematic cross-sectional plan view of the mouth piece 60 with the flaps 66, 68, 70 and 72 shown before being welded together, to illustrate the principle.

Flap portions 68 and 72 are folded, respectively, to lie between the inflatable flap portions 66 and 70, whereby, using the reference points illustrated in FIGS. 19 to 21, edge portion 'yh' of inflatable mouthpiece flap 66 (see FIG. 19) is located next to and welded to edge portion 'mn' of non-inflatable mouthpiece flap 68 (see FIG. 20), where 'yh' is ¼ of 'ch' in FIG. 19 and 'pq' is of ¼ of 'mq' in FIG. 20. Similarly, edge portion 'pq' of the non-inflatable flap 68 of FIG. 20 is located adjacent to and welded to edge portion 'cw' of inflatable mouthpiece flap 70 as shown in FIG. 21. Similar joining patterns are implemented on the other two flap portions 66, 72 that so complete the top end surface of mouth piece 60.

Following the previous step in the manufacturing process, the blank 5 is folded flat into the welded bottle blank as described previously, with an additional requirement that non-inflatable mouthpiece flaps 68 and 72 are folded into a W shape (when viewed in top plan view as per FIG. 21; tamper-evident seal removed for clarity) at the top of the mouthpiece. The folding performed on non-inflatable flap portions 68 and 72 of mouthpiece 60 is additional to that described in the context of FIG. 7 and may be performed by a variety of techniques known to those skilled in the art, including simple robotics. It is noted that the W shape in mouthpiece flaps 68 and 72 is the largest at the mouth of the bottle but tapers off to a zero fold, where the mouthpiece 60 meets the upper wall panels 29b and 29d, where the W fold is stretched straight when mouthpiece 60 is fully inflated.

The final step in the welding of the mouthpiece 64 may then be completed, and this consists of welding a length portion i between vertical edge points 'hi' (FIG. 19) to a length portion I located between vertical edge points 'mk' (FIG. 20) of the folded portions of non-inflatable flap 68 and the respective inflatable flaps 66 and 70 (as per FIG. 19) simultaneously to one another. In other words, the 'sides' of the mouthpiece 60 are welded together along part only of the height (represented by 'ab', 'hj' 'mk' and 'qs' of flaps 66, 68 and 70, 72, respectively, approximately commencing ⅓. sup.rd of the way up the mouthpiece from the neck line represented by welding line 77 in FIGS. 19 and 20. This arrangement allows the top of the mouthpiece to curve and assume a better shape than would otherwise be possible, as well as preventing stresses at the joint between mouthpiece flaps 66 to 72 and adjoining top wall panels 29 a to 29d, when the bottle 10 is inflated. The precise distance at the mouthpiece is chosen on a case-by-case basis.

Simultaneously with this welding operation, edge 'fed' of the tamper-evident seal flap 82 present at the inflatable mouth piece flap 66 shown in FIG. 19 is welded to the corresponding edge 'efg' of the other half of the tamper evident seal present on flap 70 (not shown), thus completing the bottle blank for subsequent use.

As noted above, the inflatable mouth piece flaps (or wall portions) 66, 70, when inflated, press the non-inflatable flap members 66, 72 against each other, in effect flattening and resiliently closing channel 74, similar to a self-sealing lip seal arrangement found in some back-pack drinking systems where the pressure of the drinker's teeth or lips distort a drinking tit to opens the valve. Backpack systems, however, are manufactured of stiff plastic and unlike the current invention are not inflated. The mouth of the bottle in the present invention is made preferentially oval shaped to assist with orientation of the teeth and lips, as is evident from top plan view in FIG. 16.

Figure 16:
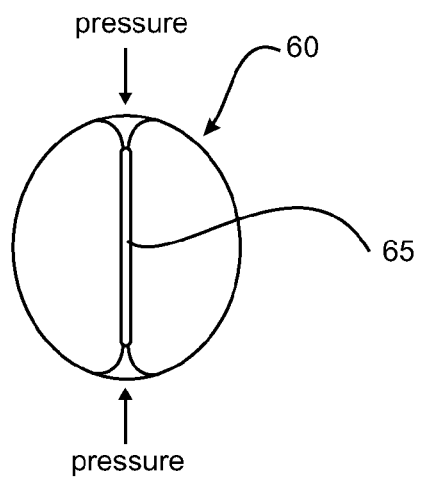

The drinking/filling channel 74 (ending in slit 65 and in another slit at the internal bottle cavity 24 which is not visible) is normally kept closed by the pressure in the exoskeleton, except when squeezed by the teeth or lips or fingers in line with the slot as indicated by the arrows in FIG. 16. This arrangement has the advantage that squeezing the main part of the bottle 10, when inflated, will increase the pressure both in the contents and simultaneously in the exoskeleton thus maintaining the seal. Another advantage of this arrangement is that the bottle may readily be filled by using a needle nozzle to penetrate the valve for filling as described below.

A tamper-evident or safety seal 80 is added across the drinking/filling slot 75. Importantly, the tamper evident seal 80 is designed and incorporated during formation of the bottle blanks to add strength to the self-closing valve arrangement provided by the inflatable mouth piece flaps 66 and 70, thereby assisting in keeping the slit 65 closed prior to use, and helping to retain the bottle contents during transport and rough use. Furthermore, it adds enough strength to the self-closing lip valve arrangement provided at the mouth piece 60 to permit filling the bottle with carbonated beverages or generate pressure from the fluid. Said tamper-evident seal is described below with reference to FIGS. 17, 18 and 19, whereas its mode of deployment during and subsequent to inflation of the bottle blank is illustrated in FIGS. 22a to 22c. For clarity purposes, the seal 80, which is a single sided flap made integral with one of the bottle blank sheets, is illustrated in FIG. 16 next to the mouth piece 60 and not on it, as compared to FIG. 18.

As previously noted, the seal 80 is integrally formed as a two part element by flaps 82 on the lower sheet 12 at inflatable flap portions 66 and 70, respectively. The width 'M' of the joined flap parts 82 shown in FIG. 15 is slightly less than the width 'N' of the fully-inflated mouthpiece at right angles to the slot 75 in the mouthpiece 64 with the slot covered in the normal resting position illustrated in FIG. 18. As the mouthpiece is inflated, the tamper-evident seal will strongly seek to maintain and further act to close the slot even further.

The tamper-evident seal flap 80 is shown in position on a fully inflated bottle in FIG. 18. The seal flaps 82 are attached to the respective inflatable mouth piece flaps 66 and 70 along line 'dh' with a tear-off capability, preferentially achieved by perforations or partial welds similar to those shown schematically in FIG. 18, and welded together at line 83. The seal 80 has a loose flap portion (84), which is the portion not directly above the mouth piece, forming a tongue that can be grasped between a finger and thumb of a person and so facilitate ripping-off and removal of the seal tab from the mouthpiece 60 of bottle 10.

The seal is tamper-evident as the only way to access the mouthpiece slot 75 of the inflated bottle is to tip off the seal tab 82 or else deflate the bottle's exoskeleton. Whereas said tamper-evident seal is shown as one piece of material in FIG. 17, it is manufactured in two halves as illustrated in FIGS. 1, 18 and 19, and hence welded in the middle during other welding operations performed in providing the inflatable bottle blank.

The process of inflating the individualised bottle blanks and filling same with a beverage will be described below, whereby other aspects of the mouth piece 60 and seal 80 will become apparent.

In FIG. 22a, the peripheral inflatable wall of mouth piece 60 of the bottle is shown in a pre-inflation condition, viewed in the direction of the slot with the bottle orientated as if standing normally on its base. It should be noted that the precise shape of the top of the mouth of the bottle in this deflated condition is not shown to avoid confusing the picture. In said pre-inflation condition, the seal flap 82 would rise over the mouth of the bottle 10 like a bonnet; this is assisted by the weld line 83 down the centre of welded flaps 82, which acts like a fold at the top of the "bonnet".

As the bottle's exoskeleton is partially inflated as illustrated in FIG. 22b, the joined inflatable mouth piece flaps 66, 70 will expand and start to flatten the bonnet shape of the tamper-evident seal flap 82. At this point in the inflation of the double skinned wall of the inflatable bottle blank, the slit 65 and channel 74 in the mouth piece 60 will not yet be sealed by the pressure building up in the exoskeleton. If the bottle is upright or suitably tilted such that the contents do not run out, a hollow needle or filling tube may be inserted into the mouth piece channel 74 through slit 65 from the side of the mouthpiece opposite the grip area of the tamper-evident seal and underneath the tamper-evident seal which is still in a bonnet shape at this point in the process and therefore, there is room to insert a filling needle or tube from this side. Once the filling tube is in place, the bottle may then be filled with liquid contents to the required level. The addition of the contents to the bottle whose exoskeleton is only partially inflated at this stage will help expand the bottle to its full size. Preferentially, there will be some additional filling of the exoskeleton contemporaneously with the filling of the contents of said bottle. Once the contents are completely placed within the bottle, the filling tube may then be withdrawn and the exoskeleton may then be fully inflated.

As shown in FIG. 22c, complete inflation of the exoskeleton fully expands the inflatable mouth piece flaps and pulls the tamper-evident seal tight across the slit 65. It is noted that other more complex inflation and filling processes can be used, ie inflation of the exoskeleton and filling of the bottle with contents are done in one operation.

To erect the bottle, ie inflate a bottle blank as obtained at the end of the manufacturing process described above, and after its separation from any storage roll or folded strip as per FIG. 5, a hollow needle is pushed through the filling hole 73h of the inflation tab arrangement 70 previously described, thereby displacing the diaphragm 78, and air or gas (or fluid) can be injected through the inflation tab into the inflation cavities and exoskeleton structure of the bottle blank. Inflation will be effected such as to reach a specific pressurisation level within the double skinned bottle blank. Once adequate pressure has been reached inside the exoskeleton, said pressure being selected depending upon the size of the bottle and the weight of its contents, the inflation needle is withdrawn and the valve closes automatically in that the diaphragm 78 will be returned against exterior air pressure to seal-off the inflation orifice 73h and be maintained in such sealing engagement by the internal pressure within the battle's double skinned walls. In this way, the one-way filling valve will close and will then be held closed by the pressure of the air or fluid inside the exoskeleton; if the bottle is 'squeezed', internal pressure will increase and assist in maintaining the seal at the inflation tab 70. This process may be assisted by the optional depositions of a small amount of high surface tension grease by the needle onto the diaphragm.

As has been set out above, the inflatable bottle blank embodying one aspect of the present invention allows devising of bottled beverage dispensing systems, in which a multiplicity of bottle blanks are stored in an deflated state within the confines of a vending machine type housing, ready for inflation to erect an exoskeleton air stiffened bottle that can be filled with a beverage and dispensed to a customer in sealed manner for subsequent consumption. Once the bottle contents has been consumed, removal/tearing-off of the inflation tab 70 will facilitate deflation of the double skinned walls of the bottle, thereby allowing collapsing thereof into a disposable flattened state.

The invention claimed is:

1. Process of manufacturing a double-skinned inflatable bottle blank which comprises: (i) stacking two sheets of liquid impermeable, flexible foil material; (ii) blanking the sheets to create respective, shape-congruent blanks having each a contoured perimeter edge; (iii) bonding the two blanks along joining seams that follow the contoured perimeter edges, but for at one or more inflation locations, thereby to define a double skinned blank into which an inflating fluid can be introduced through the inflation location; (iv) additionally bonding the two blanks at a plurality of discrete stiffening seams which are arranged in a predetermined grid thereby defining a grid-work of intersecting, inflatable stiffener structures in at least such part of the double skinned blank which will provide an upstanding peripheral wall of the bottle when erected through inflation; (v) folding the double skinned blank and (vi) selectively bonding together portions of the joined perimeter edge of the double skinned blank, but for at a predetermined filling/dispensing location, to define a double-skinned, inflatable bottle blank with an internal cavity surrounded by a bottom wall for standing the bottle upright, said peripheral wall and a top wall, the filling/dispensing location located in the top wall to define a dispensing orifice for filling and dispensing liquid into and from the internal cavity, the inflatable stiffener structures providing an exoskeleton about the internal cavity when inflated.

2. Inflatable double-skinned bottle, comprising inner and outer sheets of fluid impermeable flexible foil material which are stacked and bonded along a contoured perimeter of the sheets to provide a double skinned blank, the bonded sheets being folded such that portions of the bonded perimeters are themselves bonded to each other along joining seams thereby to define, in an erected, inflated state of the bottle, (i) a bottom wall for standing the bottle upright, (ii) a peripheral wall upstanding from the bottom wall and surrounding an internal cavity encased by the inner sheet, (iii) a top wall, (iv) a dispensing orifice, in the top wall, for filling and dispensing liquid into and from the internal cavity, and (v) at least one inflation cavity between the inner and the outer sheets in at least the peripheral wall which, when fully inflated and pressurised, provides relative stiffness to the erected bottle, wherein the inner and outer sheets of the double skinned blank are further bonded at a plurality of discrete stiffening seams present in the peripheral wall and arranged in a predetermined grid thereby defining a grid-work of intersecting, inflatable stiffener structures within the inflation cavity which together provide, in an inflated state, a stiffening exo-skeleton about the internal cavity.

3. Inflatable bottle according to claim 2, wherein the grid work of intersecting, inflatable stiffener structures extends into the top wall, thereby to increase overall rigidity and shape-stability of the bottle around the area of the dispensing orifice.

4. Inflatable bottle according to claim 2, wherein the grid work of intersecting inflatable stiffener structures consists of (i) a plurality of inflated ridges extending parallel to a reference plane or the bottom wall of the bottle, adjoining inflated ridges being separated by a line of said discrete stiffening seams, and (ii) a plurality of micro columns which respectively extend between and perpendicularly intersect two adjoining ones of said inflated ridges and which are delimited at upper and lower ends thereof by respective ones of the spaced stiffening seams that border the two inflated ridges.

5. Inflatable bottle according to claim 2, wherein the stacked sheets of the double skinned blank are bonded along paneling lines which subdivide the double-skinned blank into a predetermined number of discrete double skinned panes which are folded along said paneling lines into a polyhedral body, and wherein terminal free edges of adjoining panes are bonded together thereby to delineate the filling cavity and form the inflatable, self-contained bottle blank which upon inflation is erected into a polyhedral bottle with substantially planar side faces.

6. Inflatable bottle according to claim 2, wherein the double-skinned bottle blank has a plurality of discrete stiffening columns extending on either side of those of said paneling lines which, in an erected and upright orientation of the bottle, define upstanding corners of the bottle, the stiffening columns, in an inflated state of the bottle blank, arranged to bulge into the filling cavity of the bottle so as to press against each other and provide a stiffening of the otherwise film-hinge paneling lines between adjoining panes that make up the peripheral wall of the bottle.

7. Inflatable bottle according to claim 5, wherein the top wall of the bottle is pyramidal in shape with three, four or more triangular top wall panes, and wherein the dispensing orifice leading into the bottle cavity is formed at an apex location where individual top wall panes of the polyhedral bottle converge.

8. Inflatable bottle according claim 2, wherein a mouth piece of cylindrical or oval/oblong external configuration and cross-section is provided as an integral part of the top wall configuration.

9. Inflatable bottle according to claim 8, wherein the mouth piece is formed as an integral part of the double-skinned bottle blank in that the two stacked blank sheets each have congruent rectangular mouth piece flaps that are bonded along perimeter edges thereof thereby to provide mouth piece inflation chambers in fluid communication with the inflation cavity of the bottle, and wherein the double-skinned, perimeter-bonded mouth piece flaps are themselves joined but for at the filling/dispensing location that defines or provides the dispensing orifice leading into the internal cavity of the bottle.

10. Inflatable bottle according to claim 8, wherein a self-sealing, normally closed valve is disposed to close and permit selected access into/from the internal cavity.

11. Inflatable bottle according to claim 10, wherein the mouth piece is configured to provide a lip valve configuration upon inflation and pressurisation of the mouth piece inflation chambers, wherein a resiliently openable but otherwise self-closing dispensing channel is formed between facing surfaces of the perimeter bonded and joined mouth piece flaps which extends from the filling orifice to the bottle cavity.

12. Inflatable bottle according to claim 8, wherein a removable safety seal is provided as an integral part of the mouth piece, formed using appropriately shaped seal flaps of the blank sheets themselves in extension of selected ones of the mouth piece flaps, the seal flaps being selectively folded and bonded to deploy and extend across the dispensing orifice during inflation of the bottle blank and provide a form and stretch-fitted closure covering the mouth piece filling/dispensing orifice.

13. Inflatable bottle according to claim 2, wherein a self-closing, one way or check valve arrangement is provided at the or at each inflation location of the double-skinned blank where the two sheets are not joined/bonded together, and wherein the check valve consists of constituent parts shaped solely integrally with the two sheets that make up the inflatable, double skinned blank.

14. Inflatable bottle according to claim 13, wherein the check valve is a flap valve comprising two inflation tabs which stand proud from the contoured perimeter of the inner and outer sheets of the double skinned blank and which are themselves welded together at their respective peripheries to define an inflation pre-chamber in fluid communication with the inflation cavity defined within and between the otherwise perimetrically sealed-off inner and outer sheets, an inflation orifice being formed in one of the tabs, and a er diaphragm flap made integral with at least one of the sheets, and arranged to selectively seal off and close the inflation orifice when pressurisation of the inflation cavity of the bottle blank causes it to be retained by inflation pressure against the inflation orifice.

15. Inflatable bottle according to claim 2, wherein a rupturable deflation arrangement is provided in fluid communication with the inflation cavity present between the stacked sheets of the double skinned blank.

16. Inflatable bottle according to claim 15, wherein inflation tabs incorporating a waisted portion between a pre-chamber and the perimeter of the joined stacked sheets are configured as a tear off point for removal of the inflation tab and thereby cause exposure of the inflation cavity of the bottle for venting to atmosphere.

17. Process of manufacturing a double-skinned inflatable bottle blank according to claim 1, wherein blanking of the sheets can be effected either before or after stacking the sheets on top of each other, after bonding the two sheets along the seams that follow an intended, final contour to be imparted to the flat, joined sheets.

18. Process of manufacturing a double-skinned inflatable bottle blank according to claim 1, wherein bonding along the perimeter of the sheets to form the double skinned blank, additionally bonding the two sheets at the plurality of discrete stiffening seams and bonding the sheets along the paneling lines to provide discrete panels within the blank as identified in claim 5, is effected by welding.

19. Process of manufacturing a double-skinned inflatable bottle blank according to claim 1, wherein the double skinned blanks are manufactured using rolled-up film stock material, by drawing respective films from two storage rolls and bringing these together at a reciprocating bonding die and ambos unit or at a continuous rotary bonding roller die and counter pressure roller unit, in particular a welding rotary die and counter pressure roller unit.

20. The process according to claim 19, wherein a plurality of discrete double-skinned blanks are cut and pattern-welded successively into the bonded film stock as it passes through the welding rotary die and counter pressure roller unit, wherein support strips are left standing between successive punched and welded double walled blank patterns as well as along the side edges of the locally bonded films thereby to obtain stock material that is rolled-up on a core or Z-folded into a dispensing case from where it can be drawn for subsequent folding and bonding operations to provide the finished, individual bottle blanks that also remain joined at discrete, severable joining locations.

21. Inflatable bottle according claim 7, wherein the dispensing orifice is a mouth piece of cylindrical or oval/oblong external configuration and cross-section located in an extension of the apex of the pyramidal top wall panes.

22. Inflatable bottle according to claim 4, wherein the lines of discrete stiffening seams each extend horizontally, and wherein the micro-columns are staggered.

* * * * *